United States Patent
Maeda

(10) Patent No.: US 7,738,138 B2
(45) Date of Patent: Jun. 15, 2010

(54) IMAGE PROCESSING DEVICE, TRANSFER CONTROLLING METHOD OF IMAGE PROCESSING DEVICE, OUTPUT CONTROLLING METHOD OF IMAGE PROCESSING DEVICE, CONTROL PROGRAM OF IMAGE PROCESSING DEVICE, STORAGE MEDIUM STORING CONTROL PROGRAM OF IMAGE PROCESSING DEVICE

(75) Inventor: Hiroshi Maeda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1276 days.

(21) Appl. No.: 11/250,396

(22) Filed: Oct. 17, 2005

(65) Prior Publication Data

US 2006/0082824 A1 Apr. 20, 2006

(30) Foreign Application Priority Data

Oct. 18, 2004 (JP) ............................. 2004-303480

(51) Int. Cl.
G06F 3/12 (2006.01)

(52) U.S. Cl. ...................... 358/1.9; 358/448; 358/1.2; 358/1.13

(58) Field of Classification Search ................. 358/448, 358/471, 1.2, 1.13, 1.9; 345/537, 589
See application file for complete search history.

(56) References Cited

U.S. PATENT DOCUMENTS

| | | | |
|---|---|---|---|
| 5,802,342 A * | 9/1998 | Yoneoka et al. ............. | 345/537 |
| 6,813,394 B1 | 11/2004 | Matsumoto et al. | |
| 6,819,441 B2 | 11/2004 | Umebayashi | |
| 6,825,942 B1 | 11/2004 | Kamiyama et al. | |
| 7,081,975 B2 * | 7/2006 | Yoda et al. .................. | 358/448 |
| 2001/0012119 A1 | 8/2001 | Umebayashi | |
| 2005/0052697 A1 | 3/2005 | Kamiyama et al. | |
| 2006/0152750 A1 * | 7/2006 | Ohta et al. ................. | 358/1.13 |
| 2007/0263253 A1 | 11/2007 | Kamiyama et al. | |

FOREIGN PATENT DOCUMENTS

| | | |
|---|---|---|
| CN | 1208304 A | 2/1999 |
| JP | 1-109882 A | 4/1989 |
| JP | 1-169643 A | 7/1989 |
| JP | 10-312456 A | 11/1998 |
| JP | 2000-76275 A | 3/2000 |

* cited by examiner

*Primary Examiner*—Kimberly A Williams
(74) *Attorney, Agent, or Firm*—Birch, Stewart, Kolasch & Birch, LLP

(57) ABSTRACT

In order to realize quick writing and reading of information required in an editorial process of an image onto and from a disc type storage device, an image processing device of the present invention includes: an input image receiving section for receiving image data having been inputted; a first compression transfer section for transferring the image data received by the input image receiving section directly to an HDD; an area data generation section for generating area data of the image data on the basis of the image data having been received; a second compression transfer section for transferring the area data, having been generated by the area data generation section, to the HDD; and an output image processing section for editing the image data on the basis of the area data stored in the HDD. Thus, it is possible to quickly transfer the image data and the area data to the HDD.

16 Claims, 14 Drawing Sheets

30 : IMAGE PROCESSING SYSTEM

130 : IMAGE PROCESSING SYSTEM

IN STARTING STORAGE

IN FINISHING STORAGE

IMAGE PROCESSING DEVICE, TRANSFER CONTROLLING METHOD OF IMAGE PROCESSING DEVICE, OUTPUT CONTROLLING METHOD OF IMAGE PROCESSING DEVICE, CONTROL PROGRAM OF IMAGE PROCESSING DEVICE, STORAGE MEDIUM STORING CONTROL PROGRAM OF IMAGE PROCESSING DEVICE

This Nonprovisional application claims priority under 35 U.S.C. §119(a) on Patent Application No. 303480/2004 filed in Japan on Oct. 18, 2004, the entire contents of which are hereby incorporated by reference.

FIELD OF THE INVENTION

The present invention relates to an image processing device which stores inputted image data into a disc type storage device and carries out an editorial process with respect to the image data that has been stored.

BACKGROUND OF THE INVENTION

Conventionally, various data storage methods have been proposed in order to store inputted data into a storage device such as a hard disc drive (HDD) or the like or in order to read out data stored in the storage device.

For example, as a storage method of image data, a still video storage device which stores image data from an outside into a memory and stores the image data from the memory into a storage medium (see Patent Document 1). That is, storage of image data is carried out in the storage device as follows: image data retained in the memory is transferred to the storage medium at the time when it becomes possible to store the image data. Thus, it is not necessary to rotate a storage medium (disc) while the image processing device is on standby for storage, so that it is possible to prevent the disc and a head from being abraded away.

Further, in order to reduce time taken to read out image data stored in HDD, the following file device was proposed.

The file device stores a set of plural image components constituting a single document image into a data memory and stores management information and editorial information of the document image into an information memory. Further, contents of the data memory and the information memory are transferred to a storage device as a single file (see Patent Document 2).

(Patent Document 1)

Japanese Unexamined Patent Publication No. 109882/1989 (Tokukaihei 1-109882)(Publication date: Apr. 26, 1989)

(Patent Document 2)

Japanese Unexamined Patent Publication No. 169643/1989 (Tokukaihei 1-169643)(Publication date: Jul. 4, 1989)

However, in the arrangement of Patent Document 1, the image data from the outside is temporarily stored in the memory, and the image data is sent to the storage medium. According to the arrangement of Patent Document 1, the image data temporarily stored in the memory is collectively transferred to and is stored in the storage medium, so that it takes time to transfer the image data to the storage medium and store the image data into the storage medium after the image data has been inputted from the outside.

Further, in the arrangement of Patent Document 2, the image components, the management information and the editorial information are temporarily stored in the respective memories, and they are stored into an external storage device as a single file. Thus, as in the arrangement of Patent Document 1, it takes time to transfer the image data to the external storage device and store the image data into the external storage device after the image data has been inputted.

SUMMARY OF THE INVENTION

The present invention was completed in view of the foregoing problems, and its object is to provide (i) an image processing device for realizing a condition under which information required in carrying out an editorial process with respect to an image is quickly transferred to a disc type storage device, (ii) a transfer controlling method of the image processing device, (iii) an output controlling method of the image processing device, (iv) a control program of the image processing device, and (v) a storage medium storing a control program of the image processing device.

In order to solve the foregoing problems, an image processing device according to the present invention transfers image data, having been inputted, to a disc type storage device, and the image processing device includes: a receiving section for receiving the image data having been inputted; a first transfer section for transferring the image data received by the receiving section directly to the disc type storage device; an attribute information generation section for generating attribute information of the image data on the basis of the image data received by the receiving section; and a second transfer section for transferring the attribute information to the disc type storage device, wherein the receiving section sends the image data, having been inputted, to the first transfer section and the attribute information generation section in parallel.

Further, in order to solve the foregoing problems, a method according to the present invention is a method for controlling transfer carried out by an image processing device which transfers image data, having been inputted, to a disc type storage device, and the method includes the steps of: (i) receiving the image data having been inputted; (ii) transferring the image data, having been received in the step (i), directly to the disc type storage device; (iii) generating attribute information of the image data on the basis of the image data having been received in the step (i); and (iv) transferring the attribute information to the disc type storage device, wherein the image data having been inputted in the step (i) is provided as image data used in the steps (ii) and (iii) in parallel with the steps.

In the image processing device according to the present invention and the method according to the present invention for controlling transfer carried out by the image processing device, the first transfer section is provided, so that it is possible to transfer the image data, having been received by the receiving section, directly to the disc type storage device. Incidentally, it is general that the inputted image data is temporarily stored in a temporal storage device such as a buffer and then is stored in the disc type storage device. However, in the image processing device according to the present invention, the image data having been received by the receiving section is not stored in the buffer or the like before transferring the image data to the disc type storage device, so that it is possible to quickly transfer the received image data to the disc type storage device and store the image data into the disc type storage device. Note that, the disc type storage device is a storage device for storing data into a disc such as a hard disc, a floppy (registered trademark) disc, DVD drive, and the like.

Further, the image processing device according to the present invention includes the attribute information generation section, so that it is possible to generate the attribute information concerning the image data on the basis of the image data having been received by the receiving section. Note that, the attribute information indicative of differences in attribute such as a text area, a photograph area, and the like of the image data for example.

Further, the image processing device includes the first transfer section and the second transfer section, so that it is possible to transfer the attribute information, having been generated on the basis of the image data, to the disc type storage device while causing the first transfer section to transfer the image data, having been received by the receiving section, to the disc type storage device.

In the image processing device according to the present invention and in the method according to the present invention for controlling transfer carried out by the image processing device, it is possible to send the image data, having been received by the receiving section, to the first transfer section and the attribute information generation section in parallel, so that it is possible to simultaneously carry out a process in which the image data is transferred to the disc type storage device and a process in which the attribute information is generated on the basis of the image data so as to transfer the attribute information to the disc type storage device.

Thus, in the image processing device according to the present invention and in the method according to the present invention for controlling transfer carried out by the image processing device, the inputted image data and the attribute information generated on the basis of the image data can be quickly transferred to the disk type storage device so as to be stored therein.

Further, in order to achieve the foregoing object, an image processing device according to the present invention has: a disc type storage device for storing image data and attribute information indicative of an attribute of the image data; and an edition section for editing the image data, stored in the disc type storage device, on the basis of the attribute information stored in the disc type storage device, and the image processing device includes: a storage device for temporarily storing the attribute information stored in the disc type storage device; a first output section for outputting the attribute information, stored in the storage device, to the edition section; and a second output section for outputting the image data, stored in the disc type storage device, to the edition section.

Further, in order to achieve the foregoing object, a method according to the present invention is a method for controlling output carried out by an image processing device including: a disc type storage device for storing image data and attribute information indicative of an attribute of the image data; and an edition section for editing the image data, stored in the disc type storage device, on the basis of the attribute information stored in the disc type storage device, and the method includes the steps of: (i) temporarily storing the attribute information having been stored in the disc type storage device; (ii) outputting the attribute information, having been stored in the step (i), to the edition section; and (iii) outputting the image data, having been stored in the disc type storage device, to the edition section.

That is, in the image processing device according to the present invention and the method according to the present invention for controlling output carried out by the image processing device, it is possible to temporarily store the attribute information into the storage device so as to output the attribute information to the edition section, so that it is possible to output the attribute information at a timing different from a timing at which the second output section outputs the image data. Thus, the image processing device can appropriately set a timing at which the attribute information is outputted to the edition section and a timing at which image data is outputted to the edition section respectively, so that it is possible to efficiently output the image data and the attribute information to the edition section.

Further, the attribute information is temporarily stored in the storage device. Thus, in case where an editorial process is carried out by the edition section on the basis of the same attribute information again, it is not necessary to read out the attribute information from the disc type storage device again, and it is necessary only to read out again the attribute information temporarily stored in the storage device. That is, it is possible to read out and output the attribute information stored in the storage device in case of processing an image plural times on the basis of the same attribute information, so that the attribute information is less frequently read out from the disc type storage device.

That is, the image processing device less frequently carries out the process for reading out the attribute information from the disc type storage device, so that it is possible to reduce time required in the process for reading out the attribute information and the image data.

Thus, in the image processing device according to the present invention and the method according to the present invention for controlling output carried out by the image processing device, it is possible to quickly and efficiently read out the image data and the attribute information stored in the disc type storage device.

In order to solve the foregoing problems, an image processing device according to the present invention transfers image data, having been inputted, to a data storage section, and the image processing device includes: a receiving section for receiving the image data having been inputted; a first transfer section for transferring the image data received by the receiving section directly to the data storage section; an attribute information generation section for generating attribute information of the image data on the basis of the image data received by the receiving section; and a second transfer section for transferring the attribute information to the data storage section, wherein the receiving section sends the image data, having been inputted, to the first transfer section and the attribute information generation section in parallel.

In order to solve the foregoing problems, an image processing device according to the present invention has: a data storage section for storing image data and attribute information indicative of an attribute of the image data; and an edition section for editing the image data, stored in the data storage section, on the basis of the attribute information stored in the data storage section, and the image processing device includes: a storage device for temporarily storing the attribute information stored in the data storage section; a first output section for outputting the attribute information, stored in the storage device, to the edition section; and a second output section for outputting the image data, stored in the data storage section, to the edition section.

In order to solve the foregoing problems, a method according to the present invention is a method for controlling transfer carried out by an image processing device which transfers image data, having been inputted, to a data storage section, said method comprising the steps of: (i) receiving the image data having been inputted; (ii) transferring the image data, having been received in the step (i), directly to the data storage section; (iii) generating attribute information of the image data on the basis of the image data having been received in the step (i); and (iv) transferring the attribute information to the data storage section, wherein the image data having been inputted in the step (i) is provided as image data used in the steps (ii) and (iii) in parallel with the steps.

In order to solve the foregoing problems, a method according to the present invention is a method for controlling output carried out by an image processing device including: a data storage section for storing image data and attribute information indicative of an attribute of the image data; and an edition section for editing the image data, stored in the data storage section, on the basis of the attribute information stored in the data storage section, and the method includes the steps of: (i) temporarily storing the attribute information having been stored in the data storage section; (ii) outputting the attribute information, having been stored in the step (i), to the edition section; and (iii) outputting the image data, having been stored in the data storage section, to the edition section.

In the image processing device according to the present invention and the method according to the present invention for controlling transfer carried out by the image processing device, the image data having been received by the receiving section is not temporarily stored in a buffer or the like before transferring the image data to the data storage section, so that it is possible to quickly transfer and store the received image data into the data storage section. Note that, the data storage section is a semiconductor storage device such as a flash memory, DDR-DRAM, and the like, or an external storage device whose connection is allowed by a SAN (Storage Area Network).

Further, the image processing device according to the present invention includes the attribute information generation section, so that it is possible to generate the attribute information concerning the image data on the basis of the image data received by the receiving section. Further, the image processing device includes the first transfer section and the second transfer section, so that it is possible to transfer the attribute information, generated on the basis of the image data, to the data storage section while the first transfer section is transferring the image data, received by the receiving section, to the data storage section.

Thus, in the image processing device according to the present invention and the method according to the present invention for controlling transfer carried out by the image processing device, it is possible to simultaneously carry out a process for transferring the image data to the data storage section and a process for generating the attribute information on the basis of the image data so as to transfer the attribute information to the data storage section, so that it is possible to quickly transfer and store the inputted image data and the attribute information generated on the basis of the image data into the data storage section.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

Figure 1:
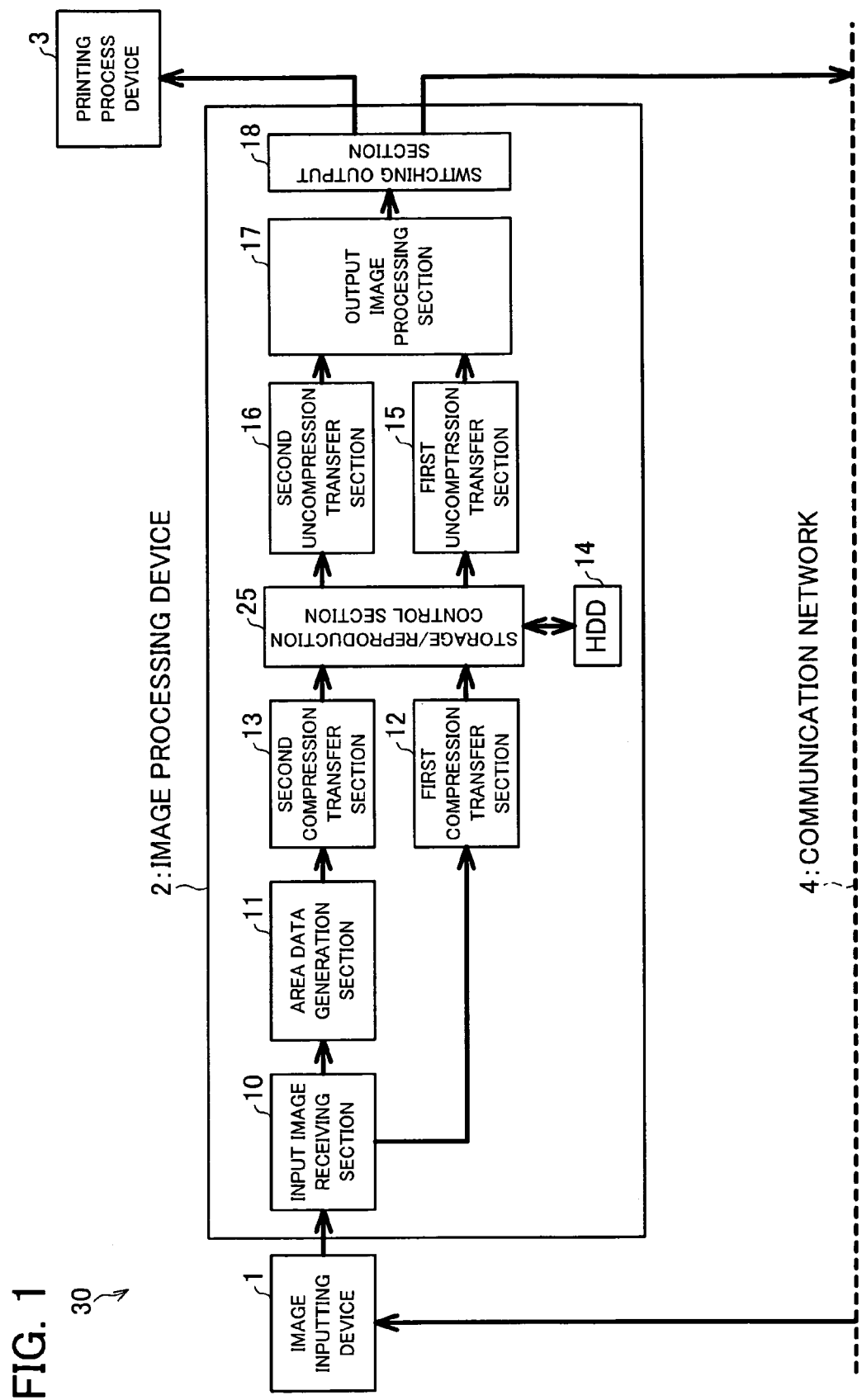
FIG. 1 is a block diagram showing an example of an essential arrangement of an image processing system according to an embodiment of the present invention.
Figure 2:
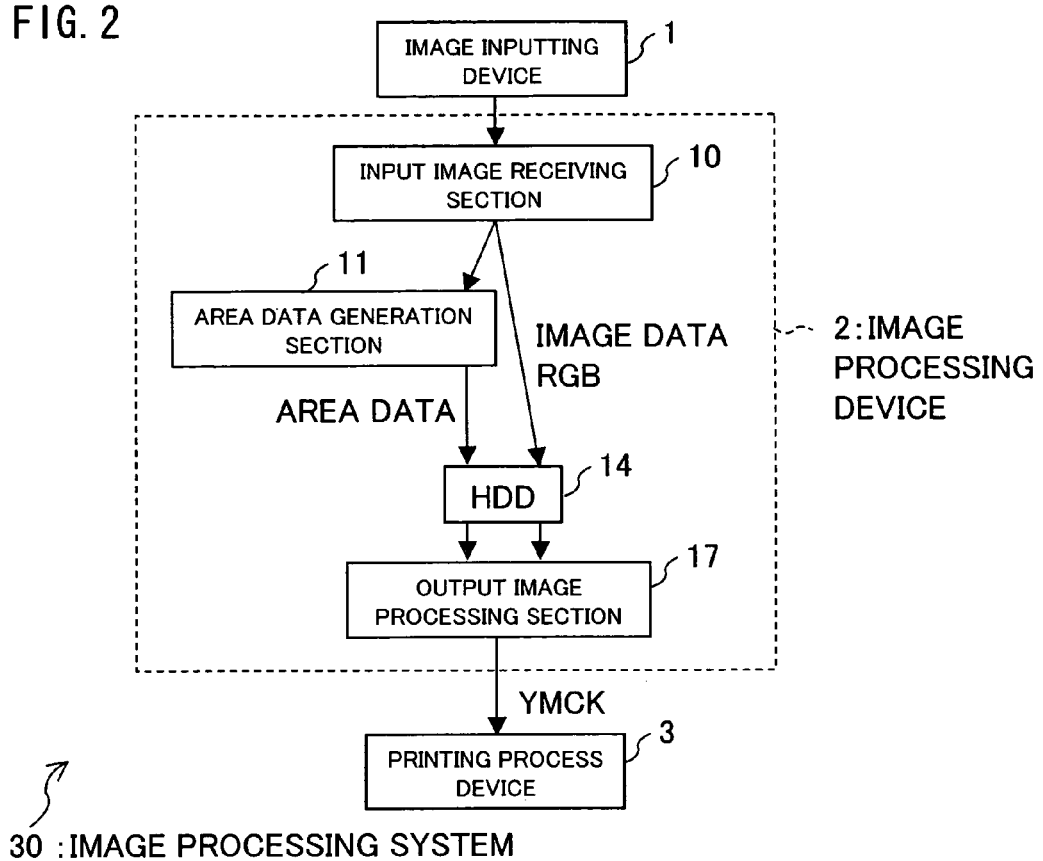
FIG. 2 is a schematic showing a flow of image data and a flow of area data in the image processing system according to the embodiment.
Figure 3:
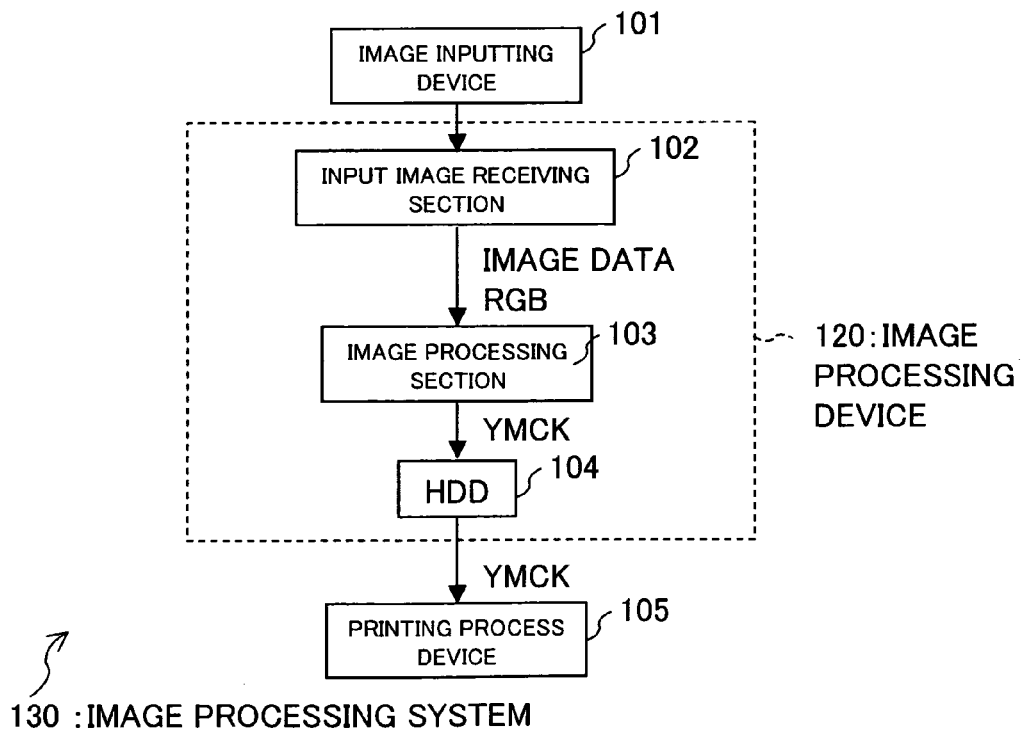
FIG. 3 is a schematic showing a flow of image data and a flow of area data in an image processing system of an example compared with the foregoing image processing system according to the embodiment.

The following description will explain one embodiment of the present invention with reference to FIG. 1 to FIG. 3. That is, an image processing system 30 according to the present embodiment processes an image on the basis of color image data having been inputted and prints out the image. Further, in the image processing system 30 according to the present embodiment, an image processing device 2 and a communication network 4 are connected to each other in a communicable manner, and an image based on image data inputted from an image inputting device 1 is processed, and thus processed image can be outputted to a PC or the like which is provided outside.

As shown in FIG. 1, the image processing system 30 according to the present embodiment includes the image inputting device 1, the image processing device 2, and a printing process device 3, wherein the printing process device 3 and/or the image inputting device 1 are connected to the communication network 4 in a communicable manner. Note that, FIG. 1 is a block diagram showing an example of an essential arrangement of the image processing system 30 according to the present embodiment.

The image inputting device 1 causes a CCD (Charge Coupled Device: not shown) sensor to read a document, and generates image data, and receives image data via the communication network 4 from a PC (Personal computer) or the like which is provided outside. The image inputting device 1 inputs image data corresponding to each pixel which has been read out by the CCD sensor into the image processing device 2. Note that, the image data inputted to the image processing device 2 is digital data based on an RGB color system.

The image processing device 2 receives the image data from the image inputting device 1, and processes an image based on the image data having been received. "processes an image" means to reproduce an image of the document in detail or to process an image of the document according to purpose of use. For example, an image area separation process (described later) in which components of the image data are separated from each other according to attributes such as a photograph and texts is carried out, and an editorial process (described later) such as color correction, scaling, filtering, and the like is carried out. The image processing device 2 outputs the image data, subjected to the image processing, to the printing process device 3. Alternatively, the image processing device 2 outputs the image data subjected to the image processing to the PC or the like, which is provided outside, via the communication network 4.

The printing process device 3 carries out a printing process on the basis of the image data having been inputted from the image processing device 2.

Here, an arrangement of the image processing device 2 according to the present embodiment is schematically described.

The image processing device 2 includes an input image receiving section 10, an area data generation section 11, a first compression transfer section 12, a second compression transfer section 13, an HDD (Hard Disc Drive) 14, a first uncompression transfer section 15, a second uncompression transfer section 16, an output image processing section 17, a switching output section 18, and a storage/reproduction control section 25.

The input image receiving section 10 sends image data, inputted from the image inputting device 1, to the first compression transfer section 12, and sends the image data also to the area data generation section 11. Note that, the input image receiving section 10 sequentially inputs the image data into the first compression transfer section 12 according to a condition under which the image inputting device 1 reads out the image data.

The area data generation section 11 temporarily stores the image data having been received from the image receiving section. When the area data generation section 11 stores the image data corresponding to a single print document, the area data generation section 11 carries out an analysis process (image area separation process) for specifying attributes such as a text portion, a photograph portion, and the like in the image data, so as to generate the area data (attribute information) on the basis of a result of the analysis process.

Note that, the area data includes not only the information indicative of the attributes such as a text portion, a photograph portion, and the like but also identification information indicating which image data corresponds to the attribute information. Further, after generating the area data, the area data generation section 11 inputs thus generated area data into the second compression transfer section 13.

The first compression transfer section 12 compresses the image data inputted from the input image receiving section 10 so as to transfer thus compressed image data to the storage/reproduction control section 25. The first compression transfer section 12 compresses thus inputted image data on the basis of JPEG (Joint Photographic Experts Group) for example. Further, the first compression transfer section 12 transfers thus compressed image data to the storage/reproduction control section 25.

Upon receiving the area data generated by the area data generation section 11, the second compression transfer section 13 compresses the area data and transfers the compressed area data to the storage/reproduction control section 25. Note that, compression of the area data is carried out in accordance with Modified Huffman (MH) or Modified Modified Read (MMR) for example.

In this way, in the image processing device 20 according to the present embodiment, the first compression transfer section 12 compresses inputted image data and transfers the compressed image data or the second compression transfer section 13 compresses area data and transfers the compressed area data, so that it is possible to reduce amounts of the image data and the area data transferred to the HDD 14. Thus, in the image processing device 20, it is possible to transfer the image data and the area data at higher speed.

The storage/reproduction control section 25 gives an instruction to a head (not shown) of the HDD 14 so as to cause a disc (not shown) of the HDD 14 to store the image data and the area data or so as to cause the image data and the area data to be read out from the disc.

The HDD 14 is a storage device which stores the image data and the area data, having been sent from the first compression transfer section 12 or the second compression transfer section 13, according to an instruction given by the storage/reproduction control section 25. The HDD 14 is structured so that aluminum or glass discs each of which has a magnetic material overlap each other at constant intervals. Thus obtained disc is rotated at high speed by a motor and a magnetic head (head) is brought near to the discs, thereby reading out or writing data.

The image data and the area data stored in the HDD 14 are read out from the HDD 14 by the storage/reproduction control section 25 when the output image processing section 17 begins to process an image, and thus read out image data is transferred to the output image processing section 17 by the first uncompression transfer section 15 and the read out area data is transferred to the output image processing section 17 by the second uncompression transfer section 16.

The first uncompression transfer section 15 restores (uncompresses) the image data read out from the HDD 14 by the storage/reproduction control section 25 and transfers the restored image data to the output image processing section 17. While, the second uncompression transfer section 16 restores (uncompresses) the area data read out from the HDD 14 by the storage/reproduction control section 25 and transfers the restored area data to the output image processing section 17.

The output image processing section 17 carries out an editorial process with respect to an image on the basis of the image data and the area data having been transferred by the first uncompression transfer section 15 and the second uncompression transfer section 16. Note that, the editorial process carried out by the output image processing section 17 means to reproduce a document image in more detail or processes the image according to purpose of use. Examples of the process are color correction, scaling, filtering, and the like. The output image processing section 17 sends the image data, subjected to the editorial process, to the switching output section 18.

That is, the image processing device 2 according to the present embodiment carries out the image area separation process and the editorial process, thereby reproducing the document image in more detail and processing the image according to purpose of use.

The switching output section 18 selects a destination to which the image data subjected to the editorial process is outputted, and switches the destination. In the image processing system 30 according to the present embodiment, the switching output section 18 is connected to the printing process device 3, and the image processing device 2 is capable of communicating with the communication network 4. Thus, as the destination to which the image data subjected to the editorial process is outputted, it is possible to select either the printing process device 3 or a device (e.g., a PC, other printing process device, or the like) provided outside via the communication network 4.

Note that, the image data outputted from the switching output section 18 is outputted to the printing process device 3 as Y (yellow)•M (magenta)•C (cyan)•K (black) color system. While, in case of outputting the image data to the device provided outside via the communication network 4, when the device can process image data based on the YMCK color system, the image data is outputted as the YMCK color system data likewise, and when the device can process the image data merely based on the RGB color system, the image data is outputted as the RGB color system data.

Here, a flow of the image data in the image processing system 30 according to the present embodiment is described as follows with reference to FIG. 2 and FIG. 3.

FIG. 2 is a diagram schematically showing a flow of the image data in the image processing system according to the present embodiment. Further, FIG. 3 is a diagram schematically showing a flow of the image data in the image processing system 30 as an example compared with the image processing system according to the present embodiment.

Note that, in FIG. 2 and FIG. 3, in order to clarify a difference between both flows of the image data, the first and second compression transfer sections 12 and 13, the first and second uncompression transfer sections 15 and 16, the storage/reproduction control section 25, and the switching output section 18 are omitted, and the image data whose image has been processed is outputted to the printing process device 3.

First, as shown in FIG. 3, in the image processing system 30 of the comparative example, a CCD sensor (not shown) provided on an image inputting device 101 reads out the image data, and inputs the image data into the input image receiving section 102. Further, the input image receiving section 102 transfers the image data to the image processing section 103 as the RGB color system data, and the image processing section 103 carries out the image area separation process in accordance with the inputted image data so as to specify attributes such as a photograph portion, a text portion, and the like. Further, the image processing section 103 carries out an image process such as a filtering process, a scaling process, a color correction, or the like, according to an image data attribute of each of areas separated from each other. Note that, the image data whose image has been processed is converted into the YMCK color system data. Further, the image processing section 103 causes transfer means (not shown) to transfer the image data, whose image has been processed, to the HDD 104 so that the image data is stored therein. Note that, the HDD 104 stores the YMCK color system image data, whose image has been processed, as a file corresponding to each attribute obtained by carrying out the image area separation process.

Each image data file stored in the HDD 104 is read out from the HDD 104 upon beginning the printing process, and thus read out image data file is outputted to the printing process device 104 by the transfer means (not shown) as the YMCK color system image data.

While, in the image processing system 103 according to the present embodiment, a CCD sensor (not shown) provided on the image inputting device 1 reads out the image data from the print document. Further, the image inputting device 1 sends the read out image data to the input image receiving section 10.

Upon receiving the image data from the image inputting device 1, the input image receiving section 10 sends the received image data to the first compression transfer section 12 and the area data generation section 11 as described above. Further, the image data (RGB color system data) is transferred to the storage/reproduction control section 25 by the first compression transfer section 12, and is stored into the HDD 14. While, the area data generation section 11 temporarily stores the image data received from the input image receiving section 10. Upon storing the image data corresponding to the print document, the area data generation section 11 carries out the image area separation process with respect to the image data, thereby generating the area data. Thus generated area data is transferred to the storage/reproduction control section 25 by the second compression transfer section 13 as described above, and is stored in the HDD 14.

In starting the printing process, the area data read out from the HDD 14 by the storage/reproduction control section 25 is transferred to the output image processing section 17 by the second uncompression transfer section 16, and the image data read out from the HDD 14 by the storage/reproduction control section 25 is transferred to the output image processing section 17 by the first uncompression transfer section 15.

In this way, when the area data and the image data are inputted to the output image processing section 17, the output image processing section 17 carries out the editorial process on the basis of the area data and the image data. The image data whose image has been processed outputted to the printing process device 3 by the switching output section 18 as the YMCK color system data.

Note that, the area data includes information indicative of an attribute in the image data and identification information indicating which image data corresponds to the attribute information. Thus, the output image processing section 17 can carry out an editorial process with respect to the image data corresponding to each attribute in accordance with the area data.

As described above, the image processing system 30 according to the present embodiment and the image processing system 130 of the comparative example are greatly different from each other as follows.

That is, in the image processing system 130, the image area separation process is carried out on the basis of the inputted image data, and the YMCK color system data whose image has been processed so as to correspond to each area is stored in the HDD 103. While, in the image processing system 30 according to the present embodiment, the inputted image data is transferred to the HDD 14 as the RGB color system data and is stored therein, and only the image area separation process is carried out with respect to the image data so as to generate the area data, and the area data is transferred to the HDD 14 and is stored therein.

That is, both the systems are different from each other in (i) the data stored in the HDD 14 and (ii) a process carried out with respect to the inputted image data before being stored in the HDD 14.

Incidentally, in case where a data amount of the YMCK color system data whose image has been processed and a data amount of the RGB color system data are compared with each other, the data amount of the latter is smaller. Thus, the image processing system 30 according to the present embodiment realizes a smaller data amount of the image data stored in the HDD than the image processing system 130 shown in FIG. 3. Thus, the image processing system 30 according to the present embodiment can more effectively use a storage area of the HDD than the image processing system 130. Further, in the image processing system 30 according to the present embodiment, an amount of the data stored in the HDD is smaller than that of the image processing system 130, so that it is possible to reduce time taken to read out or write the data from or onto the HDD.

Further, in case of transferring the inputted image data to the PC provided outside via the communication network 4, the PC processes the image data as the RGB color system data, so that the RGB color system data stored in the HDD with its image unprocessed is more effectively used as in the image processing system 30.

Further, in the image processing system 30 according to the present embodiment, inputted image data are sequentially transferred to the HDD 14 and are stored therein according to a condition under which the image inputting device 1 reads out the image data. Further, in the image processing system 30, the area data generation section 11 carries out only the image area separation process with respect to the image data so as to generate the area data, and transfers the area data to the HDD 14 and stores the area data therein.

While, in the image processing system 130 shown in FIG. 3, entire image data of a document image is read out, and its image is processed (the image area separation process and the editorial process) on the basis of the image data so as to be transferred to and stored in the HDD 14.

That is, in the image processing system 30 according to the present embodiment, only the image area separation process is carried out with respect to the image data inputted from the image inputting device 1, so that it is not necessary to carry out both the image area separation process and the editorial process unlike the image processing system 130.

Thus, compared with the image processing system 130, the image processing system 30 according to the present embodiment can reduce time taken to store entire data (image data and area data) of inputted image data into the HDD 14 after reading out the image data from a print document.

Note that, in Embodiment 1, the image data and the area data are stored in a single HDD 14, but it may be so arranged that another HDD similar to the HDD 14 is further provided and the image data and the area data are respectively stored in the one HDD and the other HDD.

In this way, when the data are respectively stored in the one HDD and the other HDD, it is possible to simultaneously store the data without giving any consideration for a timing at which data is written in each HDD.

Further, also in case of reading out the image data and the area data respectively from the HDDs, it is possible to determine a timing at which data is read out from each HDD.

Embodiment 2

Figure 4:
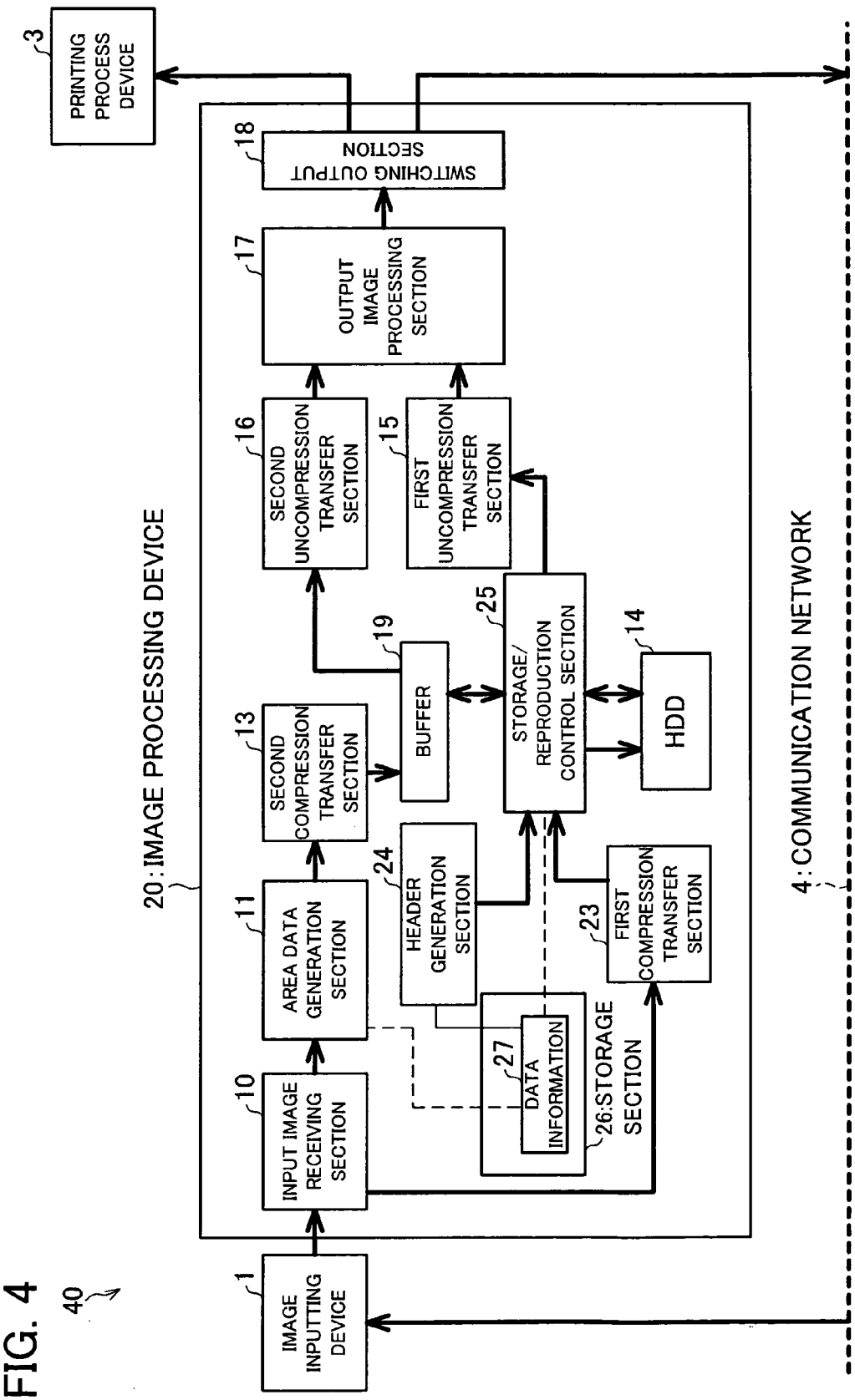
FIG. 4 is a block diagram showing an example of an essential arrangement of an image processing device according to another embodiment.

The following description will explain an image processing system 40 of an embodiment different from Embodiment 1 with reference to FIG. 4 to FIG. 13. Note that, FIG. 4 is a block diagram showing an essential arrangement of the image processing system 40 according to the embodiment.

As shown in FIG. 4, the image processing system 30 shown in FIG. 1 is different from the image processing system 40 according to the present embodiment in that the image processing device 20 further includes a buffer 19, a header generation section 24, and a storage section 26.

The buffer 19 is a memory for temporarily storing the area data. That is, in the image processing system 40 according to the present embodiment, the area data compressed and transferred by the second compression transfer section 13 is temporarily stored in the buffer 19. Further, when transfer of the image data is finished and the image data is stored in the HDD 14, the storage/reproduction control section 25 instructs the head to store the temporarily stored area data into a disc of the HDD 14 in the image processing system 40. Further, the image processing system 40 is arranged so that: also in case where the area data is read out from the HDD 14, the area data is temporarily stored in the buffer 19 and then is sent to the second uncompression transfer section 16.

The storage section 26 stores data information 27 concerning the image data and the area data, and is realized, for example, by a computer-readable/writable storage medium such as RAM (Random Access Memory) or a flash EEPROM (Electrically Erasable and Programmable ROM), or the like.

Note that, the data information 27 includes a data size of the image data, a data size of the area data, a leading address of the image data stored in a storage area of the HDD 14, and a leading address of the area data stored in the storage area of the HDD 14.

Further, as to the information, the storage/reproduction control section 25 causes the storage section 26 to store the data size of the image data and the leading address of the image data in storing the image data into the HDD 14. Further, upon storing the area data into the HDD 14, the storage/reproduction control section 25 obtains the leading address of the area data and causes the storage section 26 to store the leading address. Further, when the area data generation section 11 generates the area data, the data size of the area data is calculated and is stored in the storage section 26.

The header generation section 24 generates header information (management information) on the basis of the data information 27 stored in the storage section 26. That is, the header information includes (i) the data sizes of the image data and the area data and (ii) the leading addresses of the image data and the area data that are stored in the storage area. The generated header information is sent to the storage/reproduction control section 25, and the storage/reproduction section 25 stores the header information into the HDD 14. Note that, a process in which the storage/reproduction section 25 stores the header information into the HDD 14 is as follows.

That is, after storing the image data and the area data into the HDD 14, the storage/reproduction control section 25 instructs the header generation section 24 to generate the header information. Further, the header generation section 24 sends the generated header information to the storage/reproduction control section 25, and the storage/reproduction control section 25 controls a head (not shown) of the HDD 14 so that the header information is stored in an order shown in FIG. 8 with respect to a data reading direction of the head. That is, in reading out the information stored in the HDD 14, the storage/reproduction control section 25 controls the head so that the header information is stored in a physical (disc) storage area from which the head first reads out information.

Note that, the HDD 14 stores the header information, the area data, and the image data in the order shown in FIG. 8, and a process in which each data is stored will be detailed later.

Here, with reference to FIG. 5, a flow of the image data and a flow of the area data in the image processing system 40 according to the present embodiment are described as follows. Note that, in FIG. 5, in order to make the flow of the image data and the flow of the area data clearer, the first and second compression transfer sections 12 and 13, the header generation section 24, the storage/reproduction control section 25, and the first and second uncompression transfer sections 15 and 16 are omitted.

Figure 5:
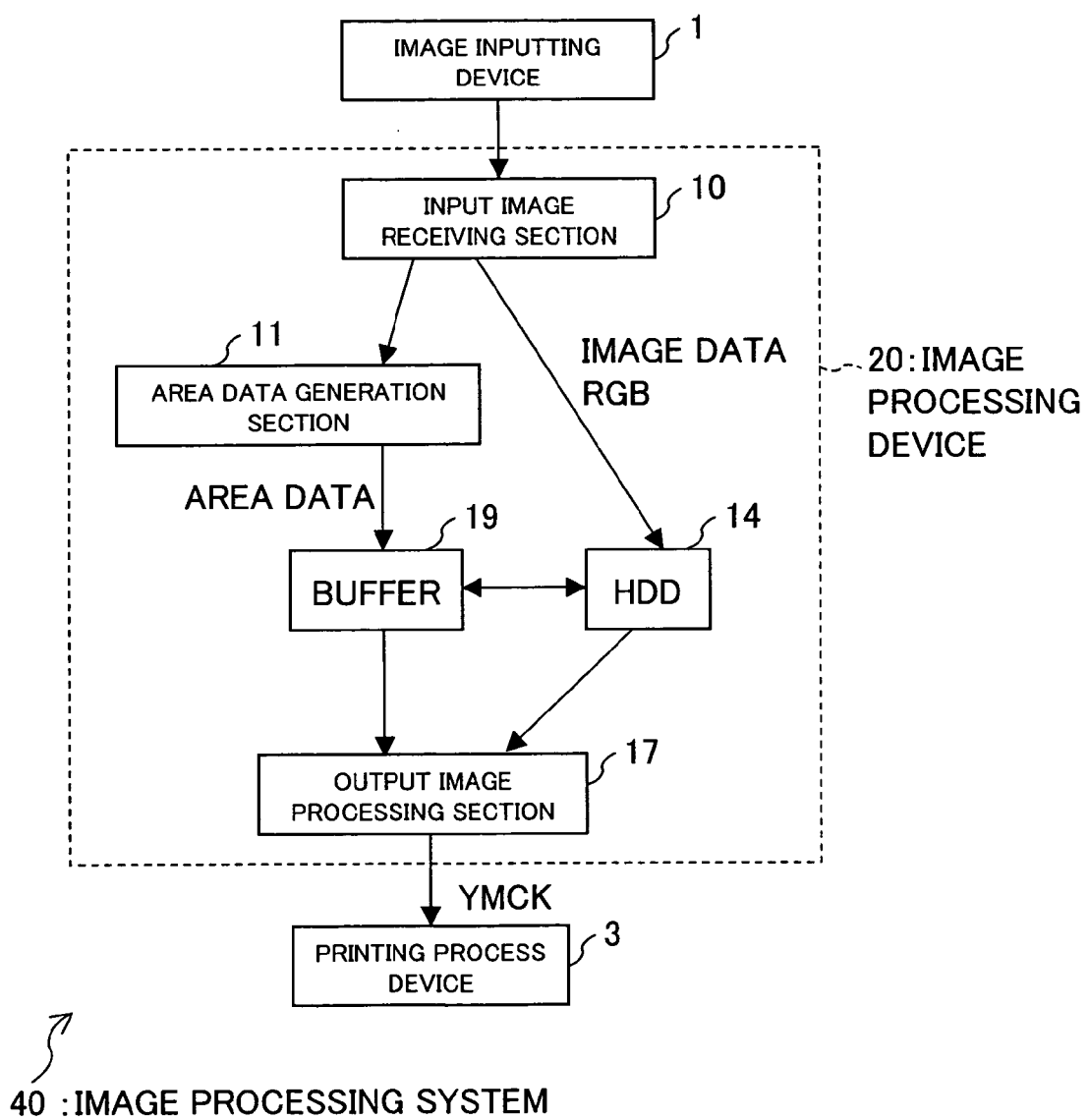
FIG. 5 is a schematic showing a flow of image data and a flow of area data in the image processing system according to the embodiment.

Here, the flow of the image data before the HDD 14 stores the image data read out from a print document by the image inputting device 1 in FIG. 5 is the same as in the flow of the image data shown in FIG. 2, so that description thereof is omitted.

While, when the input image receiving section 10 temporarily stores the image data read out by the image inputting device 1 and then sends the image data to the area data generation section 11, the area data generation section 11 stores the image data corresponding to a single print document, and generates the area data on the basis of the stored image data. Further, the generated area data is sent to the second compression transfer section 13. The second compression transfer section 13 transfers the area data, received from the area data generation section 11, to the buffer 19 and stores the area data into the buffer 19.

Here, when the image data is transferred to the storage/reproduction control section 25 by the first compression transfer section 12 and storage of the image data into the HDD 14 is finished, the storage/reproduction control section 25 reads out the area data from the buffer 19 and stores the area data into the HDD 14.

In beginning of the printing process, when the storage/reproduction control section 25 instructs the head to read out the area data from the HDD 14, the area data is temporarily stored in the buffer 19. Further, the compressed area data stored in the buffer 19 is restored (uncompressed) by the second uncompression transfer section 16, and is outputted to the output image processing section 17.

When the area data is transferred to the output image processing section 17, the first uncompression transfer section 15 reads out the image data from the HDD 14 and transfers the image data to the output image processing section 17 in response to notification indicating that transfer of the area data from the second uncompression transfer section 16 is finished.

In this way, when the image data and the area data are transferred to the output image processing section 17, the output image processing section 17 carries out the editorial process according to each attribute of the image data and outputs the processed data to the printing process device 3 on the basis of the area data and the image data.

As described above, as to the flows of the image data and the area data, the image processing system 40 of Embodiment 2 and the image processing system 30 of Embodiment 1 are greatly different from each other in that the area data is temporarily stored in the buffer 19 and then is sent to the HDD 14 by the storage/reproduction control section 25.

That is, in the image processing system 40 according to the present embodiment, it is possible to temporarily store the area data into the buffer 19 before storing the area data into the HDD 14, so that a timing at which the image data is stored into the HDD 14 and a timing at which the area data is stored into the HDD 14 can be differentiated from each other. Thus, the area data is not stored in an interruptive manner while storing the image data into the HDD 14, so that the image data and the area data can be stored in the storage area of the HDD 14 so as to have sequential addresses.

(Storage Process in which the Image Data and the Area Data are Stored)

Figure 10:
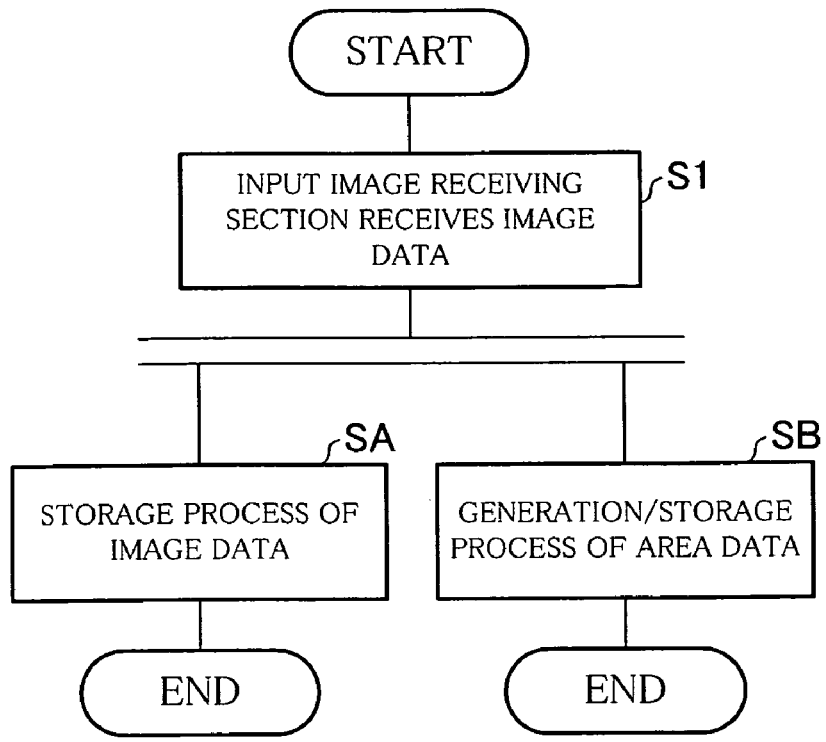
FIG. 10 is a flowchart showing an example of a process flow concerning image data having been inputted.
Figure 11:
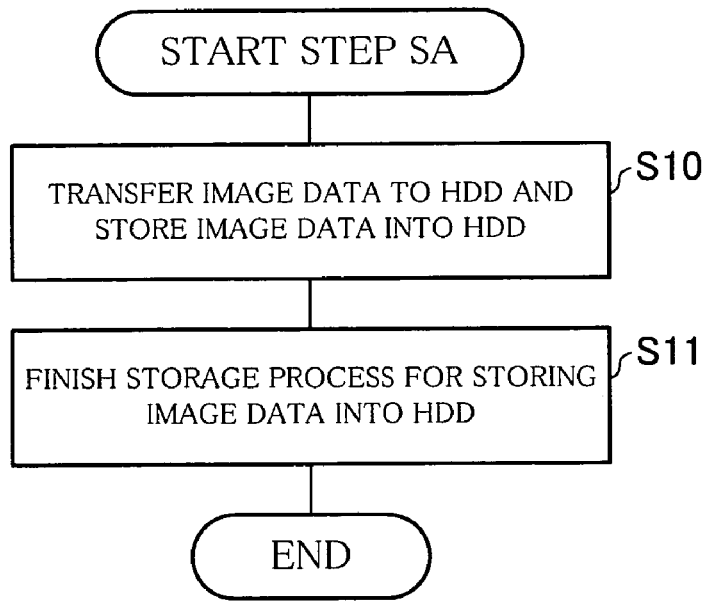
FIG. 11 is a flowchart showing an example of a storage process in which image data having been inputted is stored into an HDD.
Figure 12:
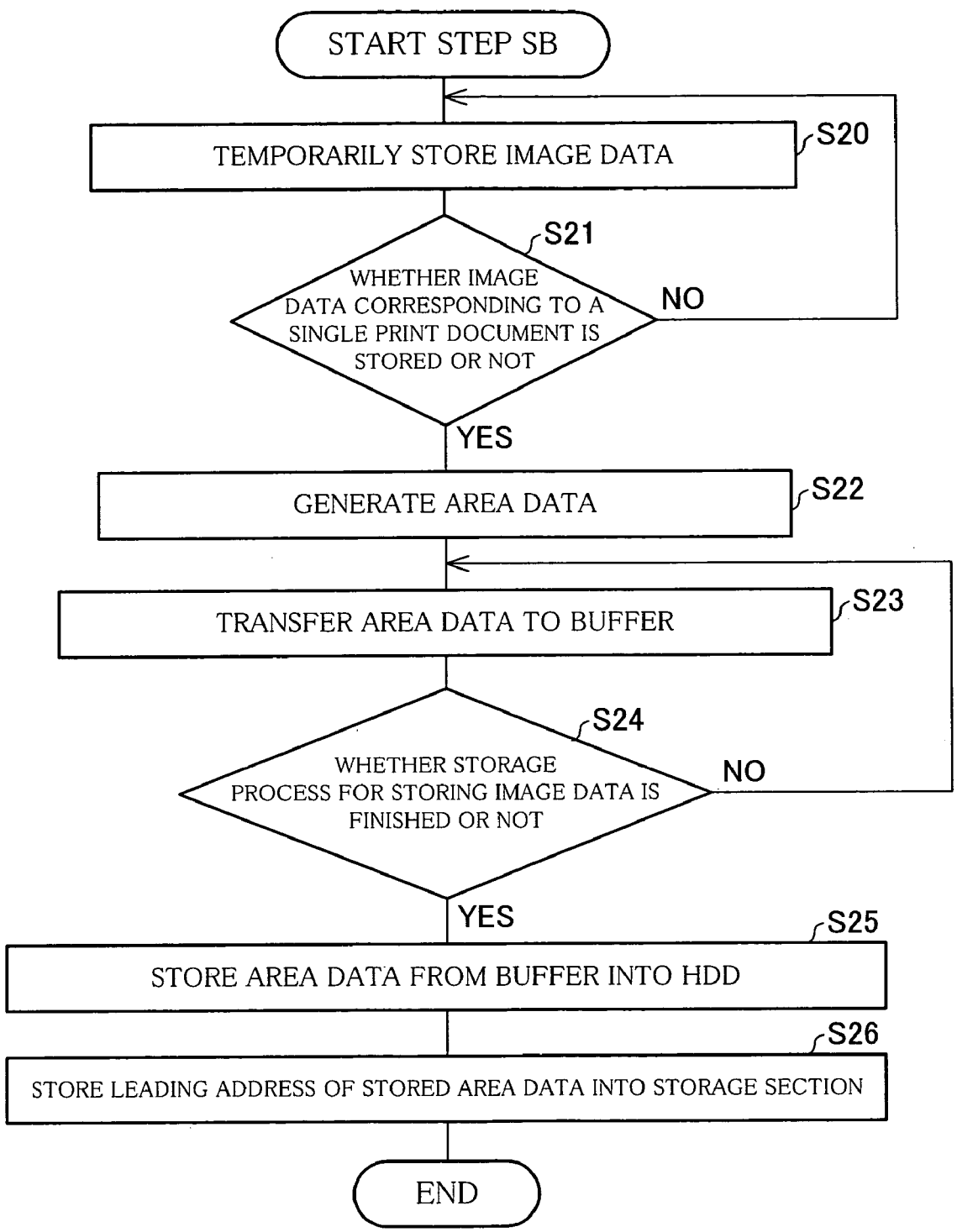
FIG. 12 is a flowchart showing an example of a generation process in which area data is generated on the basis of image data having been inputted and a storage process in which thus generated area data is stored into an HDD.

Next, the following description explains how the image data and the area data are stored into the HDD 14 in the image processing system 40 according to the present embodiment with reference to FIG. 10 to FIG. 12.

First, as shown in FIG. 10, when the image data is sent from the image inputting device 1, the input image receiving section 10 receives the image data (step S1: hereinafter, the step S1 is referred to as S1, and other steps are referred in a similar manner). When the input image receiving section 10 receives the image data, a process carried out thereafter is branched into a storage process (SA) in which the image data is stored into the HDD 14 and a generation/storage process (SB) in which the area data is generated and is stored. Then, these processes are simultaneously carried out.

First, the storage process (SA) in which the image data is stored into the HDD 14 is described as follows with reference to FIG. 11.

When the input image receiving section 10 begins to receive the image data as described above, the received image data are sequentially sent to the first compression transfer section 12. That is, upon receiving the image data from the input image receiving section 10, the first compression transfer section 12 compresses the image data for every 8 lines and every 8×8 dots, for example, in accordance with a compression format such as JPEG. Further, the first compression transfer section 12 transfers the compressed image data to the storage/reproduction control section 25, and stores the image data into the HDD 14 (S10).

Note that, the first compression transfer section 12 stores the image data, received from the image inputting device 1 via the input image receiving section 10, into an arbitrary position of a vacant area of the storage area of the HDD 14. Note that, a storage area positioned before the part storing the image data has a sufficient vacant area which allows at least the area data and the header information to be stored therein.

Figure 8:
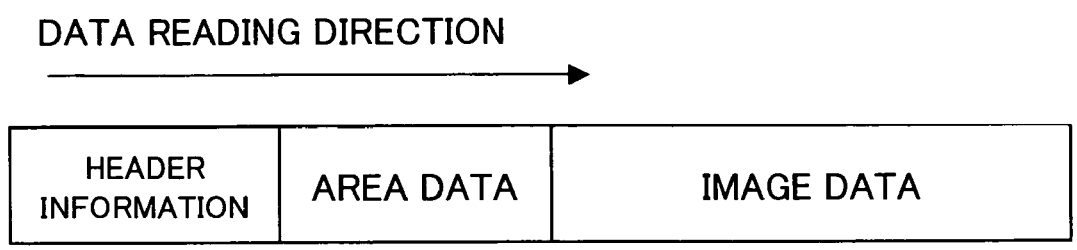
FIG. 8 is a diagram showing, as another embodiment of the present invention, a relation between (i) storage positions of image data, area data, and header information stored in a storage area of an HDD and (ii) a reading direction of a head.

That is, in the image processing system 40 ac the buffer 19 cording to the present embodiment, as shown in FIG. 8, the header information, the area data, and the image data are stored in the physical storage area of the HDD 14 in this order with respect to a reading direction of the head of the HDD 14 so that addresses on the storage area are sequential. Thus, in the storage area positioned before the part storing the image data, it is necessary to prepare a vacant area which allows the header information and the area data to be stored therein.

In this way, the storage/reproduction control section 25 finishes the storage process upon storing the entire image data corresponding to a single print document into the HDD 14 (S11). Further, upon finishing the storage process of the image data, the storage/reproduction control section 25 stores the leading address of the image data stored in the storage area of the HDD 14 into the storage section 26.

Next, the generation/storage process (SB) in which the area data is generated and is stored into the HDD 14 is described as follows with reference to FIG. 12.

When the input image receiving section 10 begins to receive the image data as described above, the input image receiving section 10 sends the received image data to the first compression transfer section 12 and also sends the image data to the area data generation section 11. The area data generation section 11 temporarily stores the received image data (S20), and determines whether the image data corresponding to a single print document has been stored or not (S21). When the image data corresponding to a single print document has been stored ("YES" in S21), the area data generation section 11 carries out the image area separation process with respect to the stored image data. Further, the area data generation section 11 specifies each attribute in the image data, and generates area data on the basis of the specified attribute (S22). Further, upon generating the area data, the area data generation section 11 stores a data size of the generated area data into the storage section 26. Further, the area data generation section 11 sends the generated area data to the second compression transfer section 13.

Upon receiving the area data from the area data generation section 11, the second compression transfer section 13 compresses the area data and transfers the compressed area data to the buffer 19, and temporarily stores the area data into the buffer 19 (S23).

The storage/reproduction control section 25 determines whether the entire image data transferred from the first compression transfer section 12 has been stored into the HDD 14 or not (S42). When the entire image data has been stored in the HDD 14 ("YES" in S24), the area data is read out from the buffer 19 and is stored into the HDD 14 (S25). Further, the storage/reproduction control section 25 stores the leading address of the area data stored in the HDD 14 into the storage section 26 (S25).

Note that, in the image processing device 20 according to the present embodiment, as in the image processing device of Embodiment 1, when the input image receiving section 10 receives the image data from the image inputting device 1, the first compression transfer section 12 directly transfers the image data to the HDD 14 as the RGB color system data. Thus, the image processing device 20 according to the present embodiment can quickly store the image data into the HDD 14.

Further, the image processing device 20 carries out only the image area separation process with respect to the inputted image data, so that it is possible to reduce time taken to store information (the image data and the area data) concerning the inputted image data into the HDD 14.

Further, the image data is stored in the HDD 14 as the RGB color system data, so that an amount of stored data is smaller than a case where the YMCK color system data whose image has been processed (the image area separation process and the editorial process) is stored. Thus, it is possible to effectively use the storage area of the HDD 14. Further, an amount of stored data is smaller than a case where the image data whose image has been processed is stored in the HDD 14, so that it is possible to store the image data in the HDD 14 and read out the image data from the HDD 14 more quickly.

Figure 6:
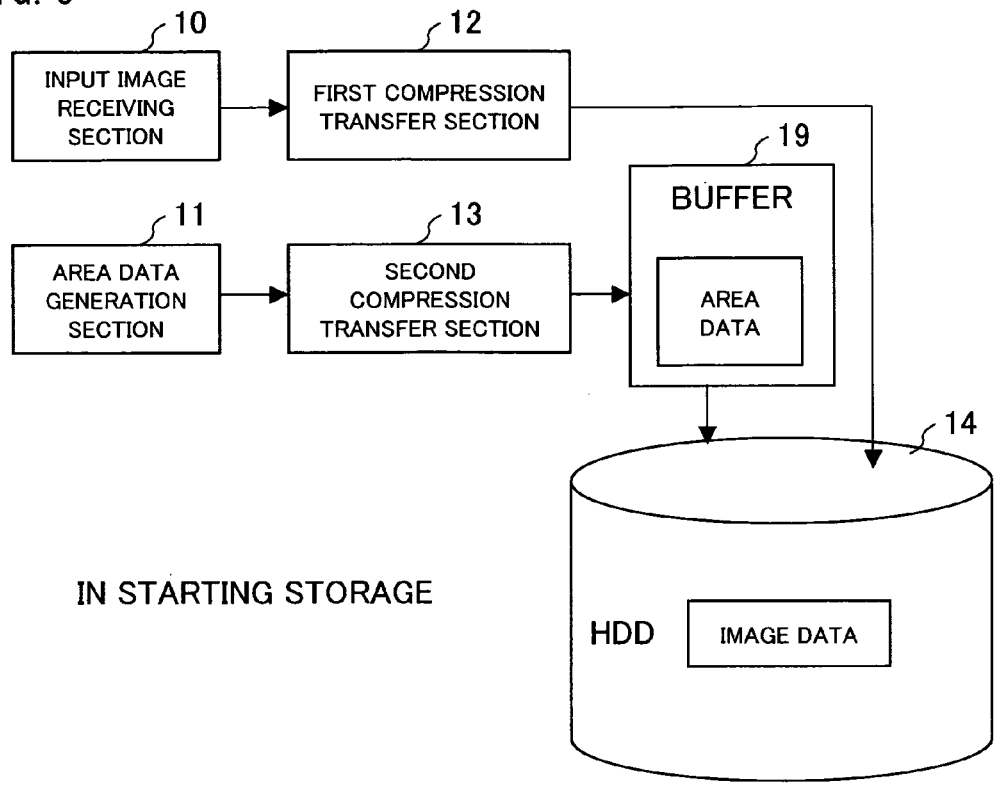
FIG. 6 is a diagram showing, as another embodiment of the present invention, a state in which the image data and the area data are stored in an HDD 14 of the image processing system according to the embodiment.
Figure 7:
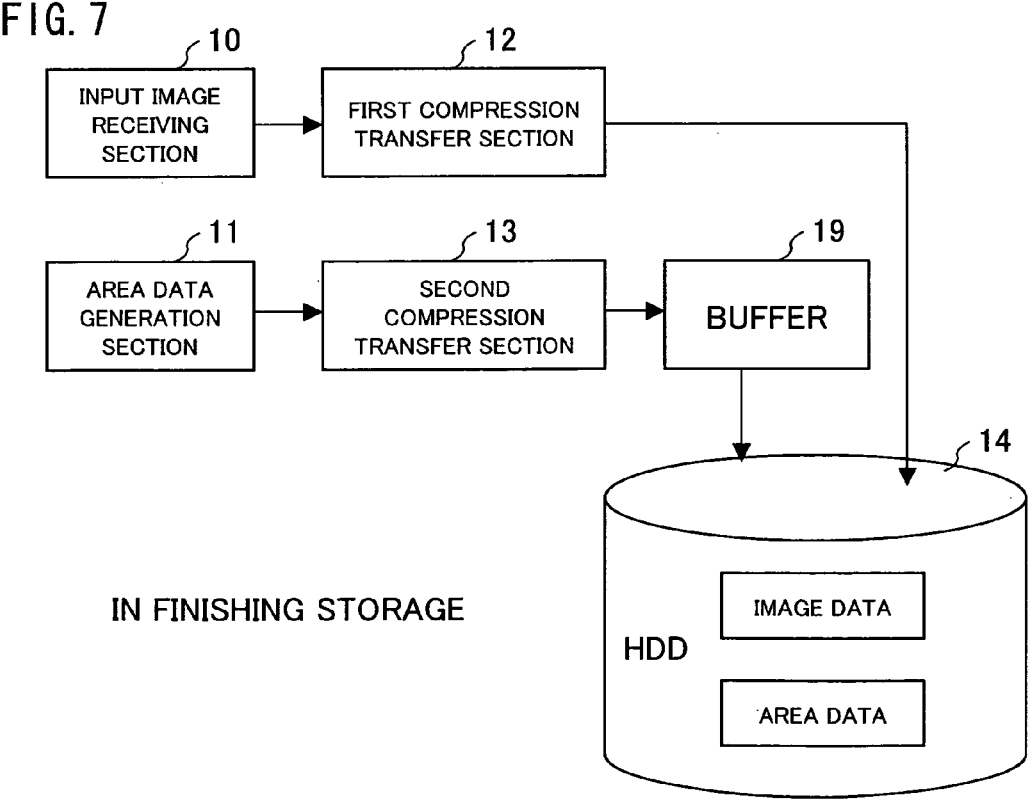
FIG. 7 is a diagram showing, as another embodiment of the present invention, a state in which storage of the image data and the area data into an HDD is finished in the image processing system according to the embodiment.

Incidentally, in the image processing system 40 according to the present embodiment, as to an order in which the image data and the area data are stored into the HDD 14, first, the image data is transferred to and is stored in the HDD 14 as shown in FIG. 6 and FIG. 7. That is, the image data is stored into the HDD 14 prior to the storage of the area data. While, the area data is temporarily stored in the buffer 19 until the entire image data is stored into the HDD 14. Further, when the entire image data is stored in the HDD 14, the storage/reproduction control section 25 reads out the area data from the buffer 29 and stores the area data into the HDD 14.

Further, the image data, the area data, and the header information are stored in a physical storage area of the HDD 14 in an order of the header information, the area data, and the image data, with respect to a reading direction of the head as described above. Here, the following description explains how storage positions of the data and information are determined so that the data and information are stored in the storage area of the HDD 14 in the order shown in FIG. 8.

(How a Storage Position of Each Data in the HDD is Determined)

As described above, first, the image data is stored in a vacant area of the storage area in the HDD 14 by the first compression transfer section 12. Upon storing the image data in the HDD 14, the storage/reproduction control section 25 causes the storage section 26 to store the leading address indicative of the area storing the image data.

Next, in storing the area data, the storage/reproduction control section 25 reads out the data size of the area data and the leading address of the stored image data from the data information 27 with reference to the data information 27 stored in the storage section 26. Further, in a storage area positioned before the leading address of the image data, a vacant area corresponding to the data size of the area data is prepared in accordance with the foregoing leading address, and a leading address of the prepared vacant area is calculated.

That is, an address positioned before a leading address indicative of a physical area storing the image data in the HDD 14 so that a distance between both the addresses corresponds to the data size of the area data is calculated as the leading address of the area data to be stored. Note that, the storage area positioned before the leading address of the image data is a storage area positioned physically closer to a movement starting position of the head of the HDD 14 than an area storing the image data in a moving direction of the head at the time of the storage process.

Further, the area data is stored in the storage area of the HDD 14 in accordance with the leading address having been calculated. In this manner, the area data and the image data are sequential data in this order in the reading direction of the HDD 14.

Further, upon finishing storage of the area data into the HDD 14, the storage/reproduction control section 25 stores the leading address of the area data stored in the HDD 14 into the storage section 26 as data information 27 and instructs the header generation section 24 to generate header information.

According to the instruction given from the storage/reproduction control section 25, the header generation section 24 generates the header information in accordance with the data information 27. Further, the header generation section 24 sends the header information 27 to the storage/reproduction control section 25. Upon receiving the header information, the storage/reproduction control section 25 stores the header information into the HDD 14. Note that, a data size of the header information is a fixed value which is recognized in advance. Thus, the storage/reproduction control section 25 stores the header information with the storage started from an address positioned before the leading address of the area data so that a distance between both the addresses corresponds to the data size of the header information.

Thus, as shown in FIG. 8, it is possible to sequentially store the header information, the area data, and the image data in this order in the storage area with respect to the reading direction of the head of the HDD 14.

In this way, the image processing device 20 according to the present embodiment temporarily stores the area data into the buffer 19, so that it is possible to store the area data after storing the image data into the HDD 14. Thus, the area data is not stored into the HDD 14 in an interrupting manner while storing the image data into the HDD 14, so that it is possible to store the image data and the area data in the storage area of the HDD 14 so as to have sequential addresses.

Thus, in reading out the image data or the area data from the HDD 14, each data can be sequentially read out from the leading address, so that it is possible to reduce a distance at which the head moves above the disc of the HDD 14, thereby raising the reading speed.

Further, in the image processing device 20 according to the present embodiment, the image data and the area data are stored in the HDD 14 so that the header information, the area data, and the image data are sequential in a reading direction of the head in the storage area of the HDD 14.

Incidentally, in case of reading out the area data and the image data from the HDD 14 and outputting the read data to the output image processing section 17, a head for reading out the data stored in the HDD 14 operates as follows. That is, first, the head reads out the header information, and confirms the leading address indicative of a physical area storing the area data in the HDD 14. Further, the area data is read out with reference to the leading address. Further, the header information is read out, and the leading address of the image data is confirmed, thereby reading out the image data.

Thus, in case where the header information, the area data, and the image data are stored in a reading order with respect to the reading direction of the head as in the present embodiment, it is possible to reduce a distance at which the head moves in reading out the data, so that it is possible to efficiently read out the data.

Further, in the image processing device 20 according to the present embodiment, even in case where a document image includes an area having plural attributes such as an area having plural photograph portions or an area having text portions for example, a file of the image data and a file of the area information are not generated for each attribute, but they can be treated as a single file.

That is, the area data includes information indicative of a relationship between the area data and the image data. Thus, after reading out the area data, it is possible to read out the image data corresponding to the area data. Further, in case where a print document includes plural attributes, plural information respectively corresponding to the attributes are included in the area data.

Thus, it is necessary to manage the area data so that the attributes included therein can be discriminated from each other.

In the image processing device 20 according to the present embodiment, data constituting the area data is managed so that information concerning plural attributes included in the area data can be separately picked up. Further, in the image processing device 20, the information concerning the attributes in the area data are assigned with addresses respectively corresponding to the attributes, and they are stored in the HDD 14 so that the addresses are sequential.

Note that, information to determine each attribute of the area data becomes fixed-length data after uncompressing the data. Further, also information which points (specifies) image data corresponding to each attribute becomes fixed-length data. Thus, information obtained by combining each attribute with information which points image data corresponding to the attribute is stored in the storage area of the HDD 14 as the area data. In this way, in the HDD 14, the area storing the area data stores (i) information indicative of each attribute and (ii) information which points image data corresponding to the attribute.

Thus, in the image processing device 20 according to the present embodiment, it is not necessary to generate plural files each of which respectively includes data indicative of each attribute and image data corresponding to the area data having plural attributes, so that it is possible to store the area data having plural attributes and the image data into the HDD 14 as a single file.

Note that, in case where plural attributes are included in a print document, the area data having plural attributes is managed as follows: information obtained by combining (i) data indicative of each attribute and (ii) information which points image data corresponding to the data is not assigned with a single address, but information indicative of subsequent combination to be coupled with the foregoing combination may be included.

In this way, in case where the information indicative of the coupling between combinations respectively corresponding to the attributes is included, the information indicative of the combinations stored in the leading address of the area data is read out in the area data, so that it is possible to read out (i) information indicative of a subsequent attribute and (ii) information which points the image data corresponding to the attribute.

In this way, in the image processing device 20 according to the present embodiment, it is possible to treat the image data and the area data as a single file, so that it is possible to less frequently open and close files than a case where there are plural files of the area data and the image data respectively corresponding to attributes. Thus, the image processing device 20 can efficiently store or read out the image data and the area data into or from the HDD.

(Process for Reading Out the Image Data and the Area Data)

Figure 13:
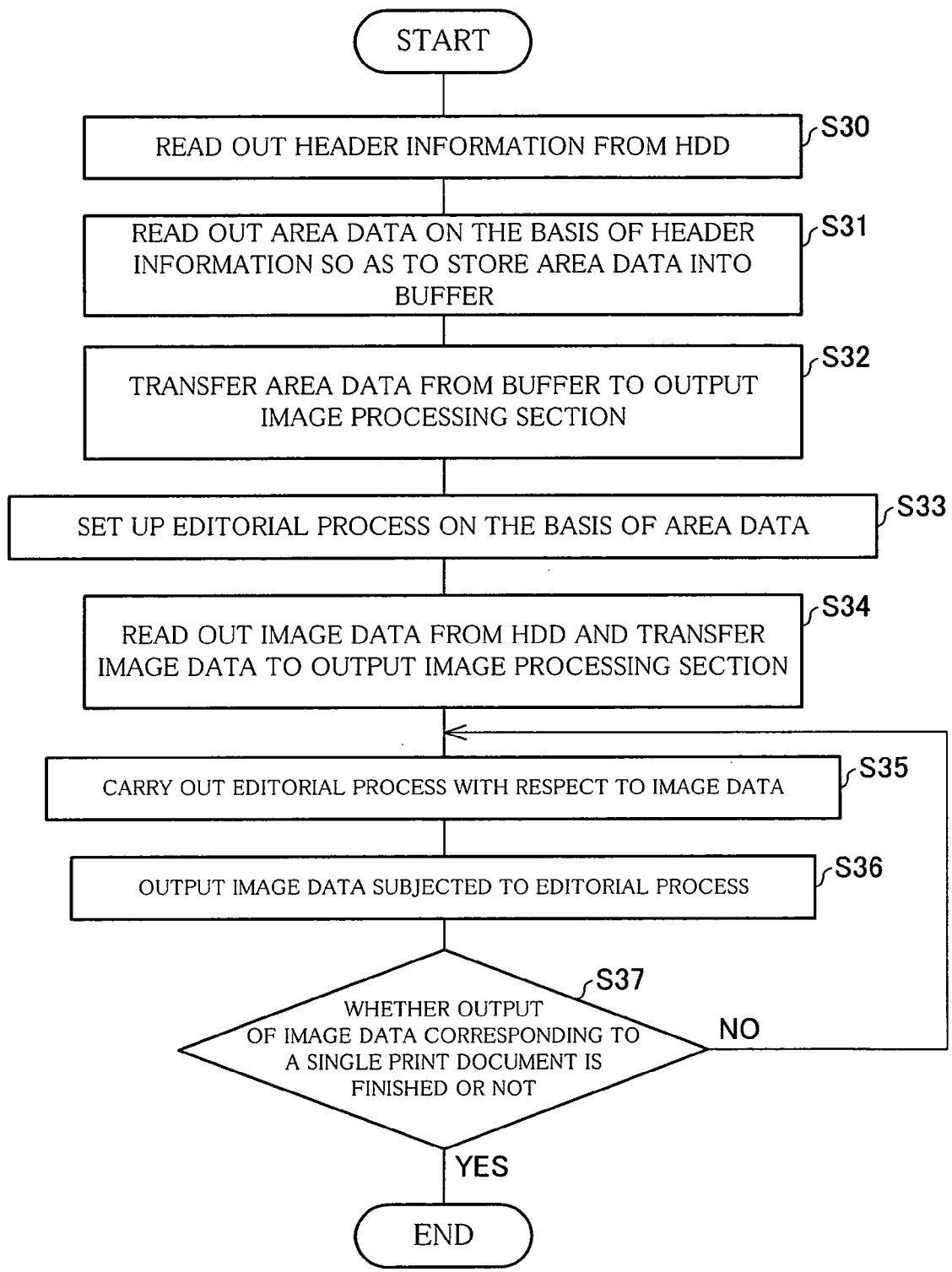
FIG. 13 is a flowchart showing an example of a reading process in which information is read out from an HDD.

Here, how the image data and the area data are read out in the image processing device 20 according to the present embodiment is described as follows with reference to FIG. 13.

First, when an instruction to start a printing process is given, the storage/reproduction control section 25 reads out the header information from the HDD 14 (S30). That is, the storage/reproduction control section 25 instructs the head of the HDD 14 to read out the header information from the disc of the HDD 14. In response to the instruction given from the storage/reproduction control section 25, the head reads out the header information from the disc of the HDD 14 and sends the header information to the storage/reproduction control section 25. In accordance with the header information having been read out, the storage/reproduction control section 25 instructs the head to read out the area data. Further, the storage/reproduction control section 25 temporarily stores the area data having been read out into the buffer 19 (S31).

Note that, the header information includes the leading address of the area data in the storage area of the HDD 14, and the area data is stored so that addresses are sequentially disposed in the physical storage area of the HDD 14. Thus, the storage/reproduction control section 25 easily causes the head to read out the area data merely by inputting the leading address of the area data into the head.

Upon temporarily storing the area data into the buffer 19, the storage/reproduction control section 25 instructs the second uncompression transfer section 16 to transfer the area data, temporarily stored in the buffer 19, to the output image processing section 17.

In response to the instruction given from the storage/reproduction control section 25, the second uncompression transfer section 16 reads out the area data from the buffer 19, and restores (uncompresses) the area data having been read out, and transfers the area data having been restored to the output image processing section 17 (S32).

When the area data is transferred from the buffer 19, the output image processing section 17 carries out set-up for an editorial process corresponding to each attribute in accordance with the area data (S33).

At a timing at which the set-up based on the area data is completed in the output image processing section 17, the second uncompression transfer section 16 instructs the first uncompression transfer section 15 to transfer the image data to the output image processing section 17.

In response to the instruction given from the second uncompression transfer section 16, the first uncompression transfer section 15 reads out the image data from the HDD 14, and restores (uncompresses) the image data having been read out, and transfers the image data to the output image processing section 17 (S34). That is, the first uncompression transfer section 15 instructs the head to read out the image data from the HDD 14, and outputs the image data, having been read out by the head, to the output image processing section 17.

The output image processing section 17 carries out the editorial process, having been set corresponding to the area data, with respect to the image data sent from the first uncompression transfer section 15 (S35). Further, the output image processing section 17 sends the image data, having been subjected to the editorial process, to the switching output section 18 as the YMCK color system data, and the switching output section 18 selects an output destination, and outputs the image data (S36). Note that, the printing process device 3 or the PC etc. provided outside via a communication network is selected as the output destination of the image data as described above.

Further, whether or not the image data subjected to the editorial process corresponding to a single print document has been outputted to the output destination is determined (S37). When the image data subjected to the editorial process corresponding to a single print document is outputted to the output destination ("YES" in S37), the process is finished.

In this way, the image processing device 20 according to the present embodiment is arranged so as to temporarily store the area data into the buffer 19 and transfer the area data to the output image processing section 17. Thus, in case of reading out the same area data from the HDD 14 again so as to cause the output image processing section 17 to carry out the editorial process based on the area data with respect to the image data, it is possible to store the area data into the buffer 19, so that it is not necessary to read out the area data from the HDD 14. That is, it is possible to less frequently read out the area data from the HDD 14.

Further, in the image processing device 20 according to the present embodiment, the area data is temporarily stored in the buffer 19 and the area data is transferred to the output image processing section 17, so that it is possible to separate a timing for reading out the area data from a timing for reading out the image data. Thus, in the HDD 14, it is possible to prevent the following problem: the area data is read out in an interruptive manner while reading out the image data or the image data is read out in an interruptive manner while reading out the area data, so that the sensor head above the disc has to widely move. Thus, the image processing device 20 according to the present embodiment can efficiently reads out the image data and the area data.

Further, in the image processing system 40 of Embodiment 2, the "process for storing the image data and the area data", the "process for reading out the image data and the area data", and the process for editing the image data on the basis of the area data may be carried out as shown in FIG. 14 to FIG. 18.

Figure 14:
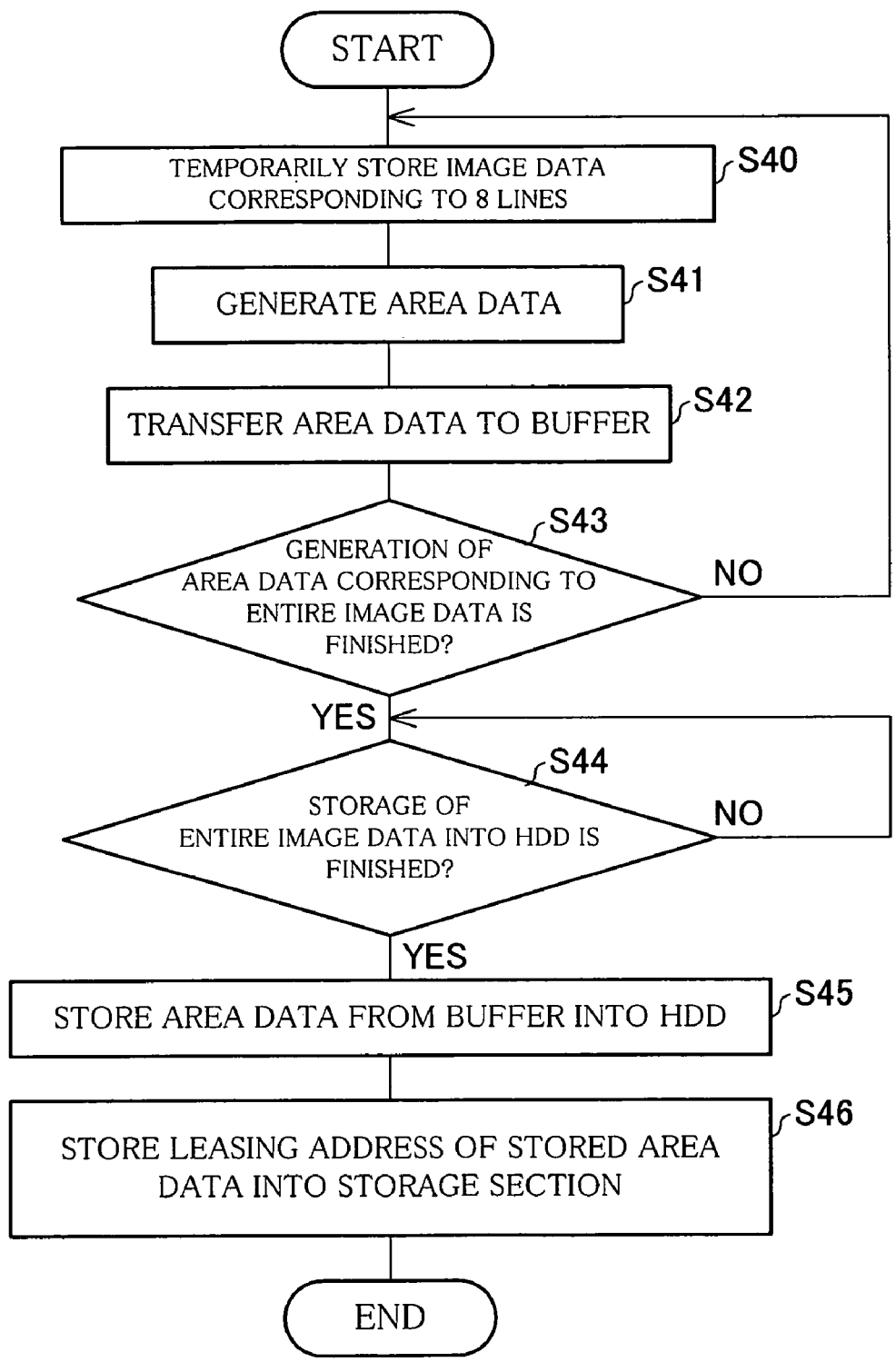
FIG. 14 is a flowchart showing an example of a generation process in which area data is generated on the basis of image data having been inputted and an example of a storage process in which thus generated area data is stored into an HDD.
Figure 15:
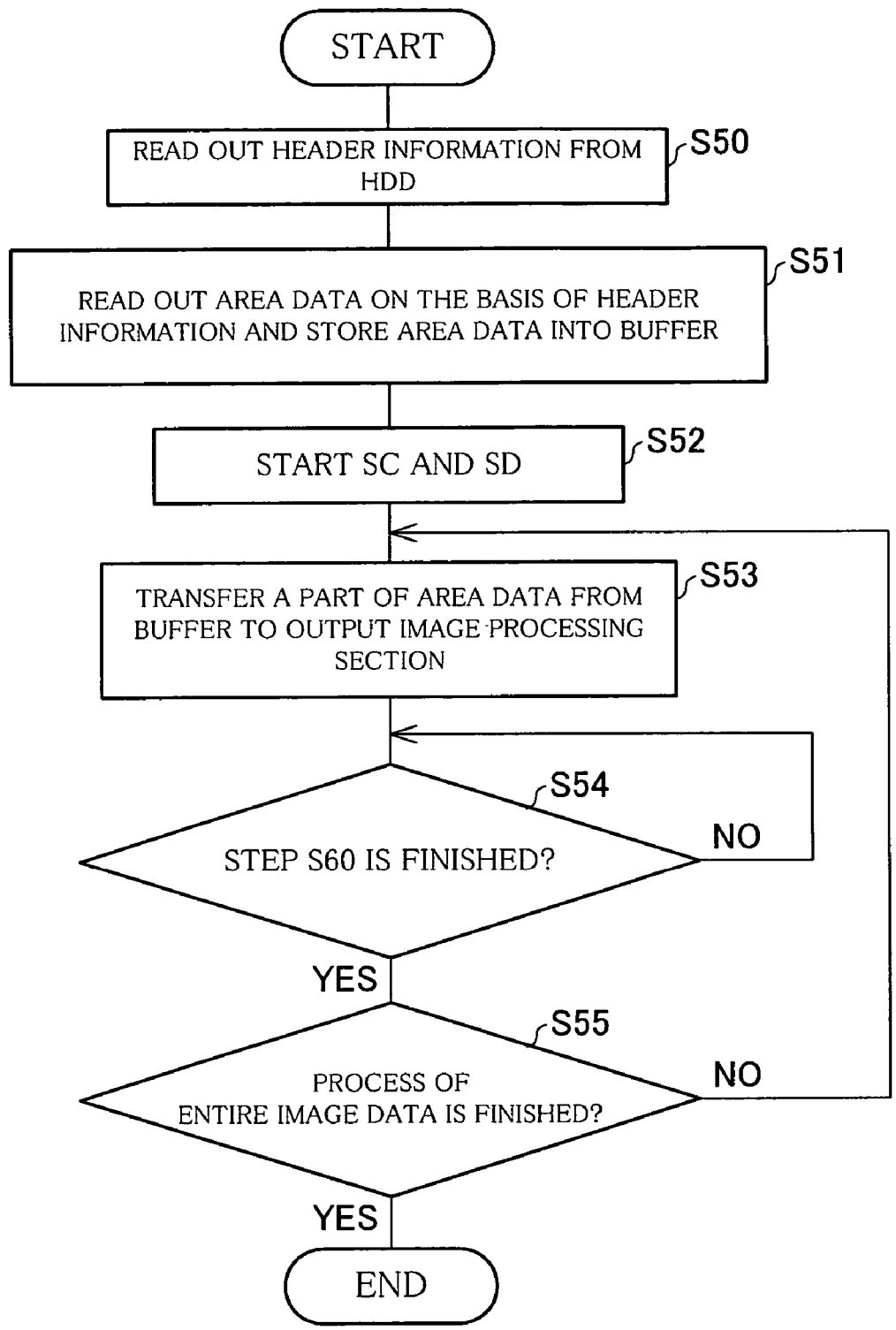
FIG. 15 is a flow chart showing an example of a transfer process in which the area data is transferred from an HDD to an output image processing section.
Figure 16:
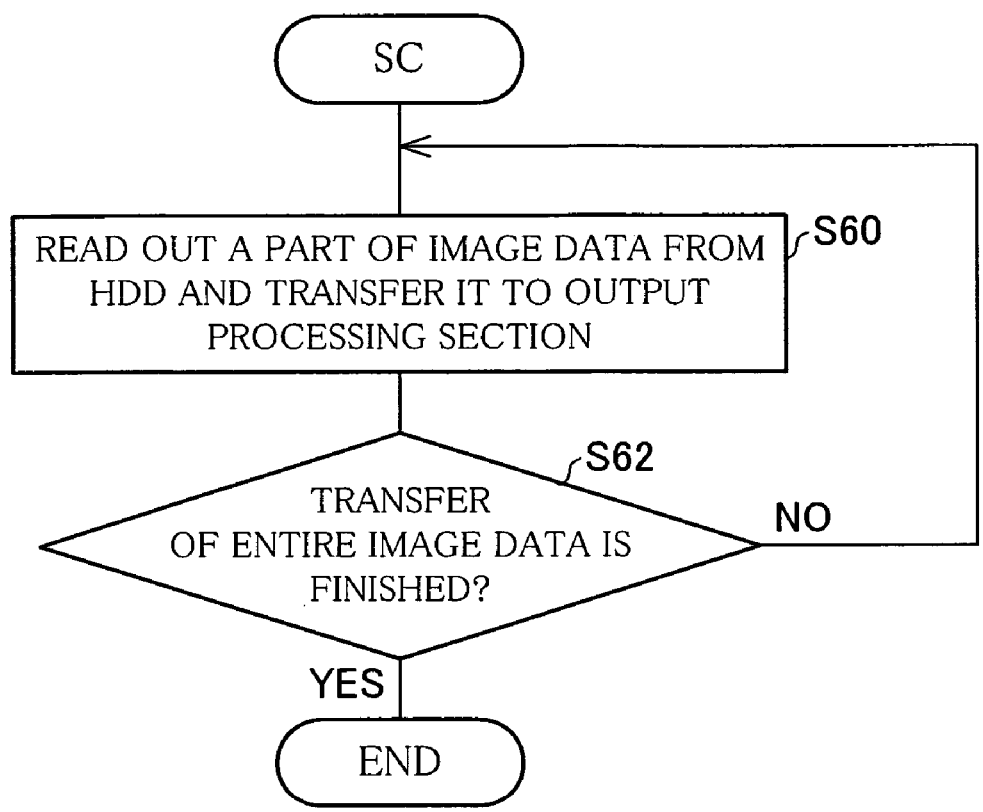
FIG. 16 is a flowchart showing an example of a transfer process in which the area data is transferred from an HDD to an output image processing section.
Figure 17:
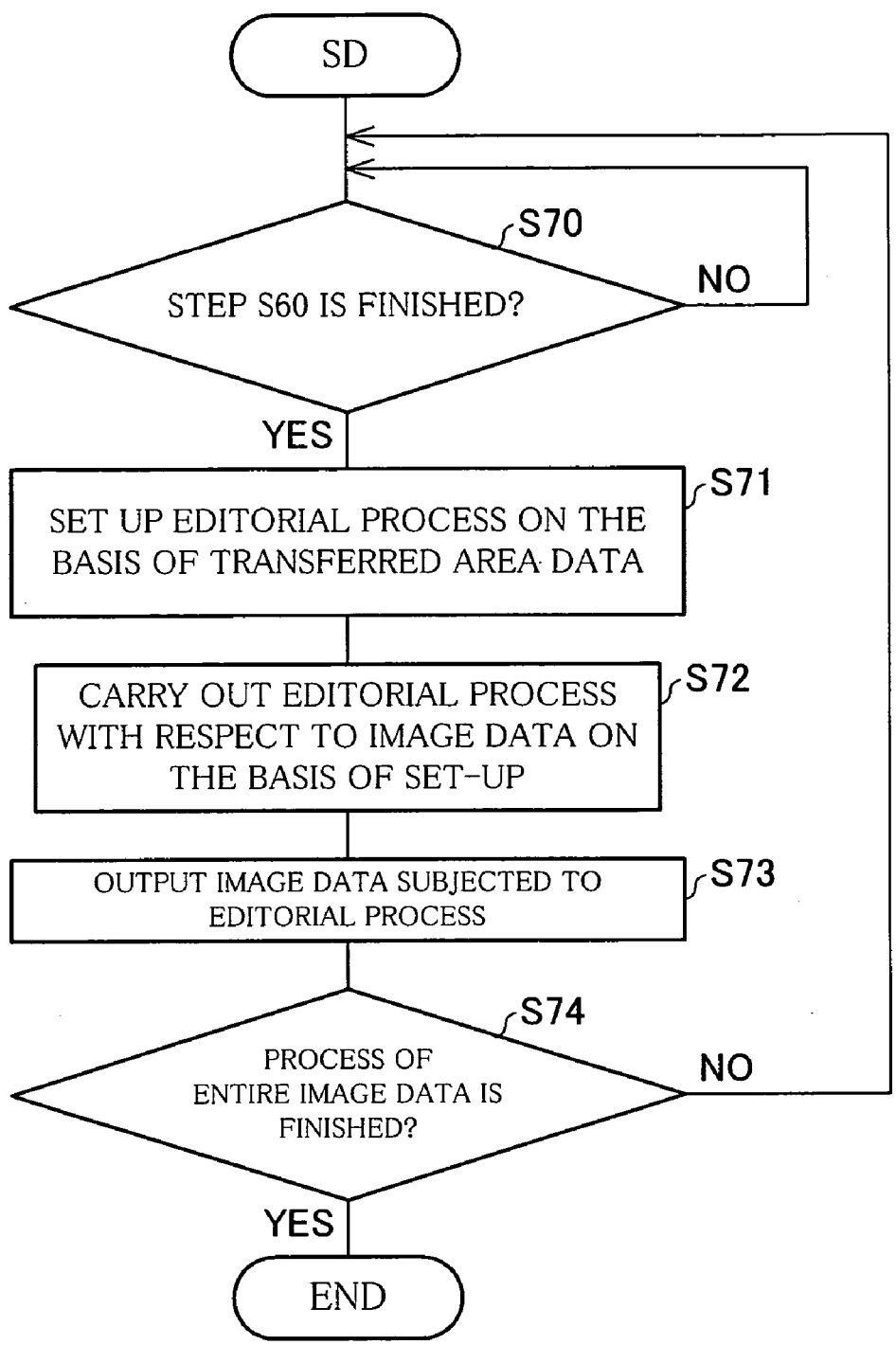
FIG. 17 is a flowchart showing an image editorial process in which the image data based on the area data is edited in an image processing device according to the present embodiment.
Figure 18:
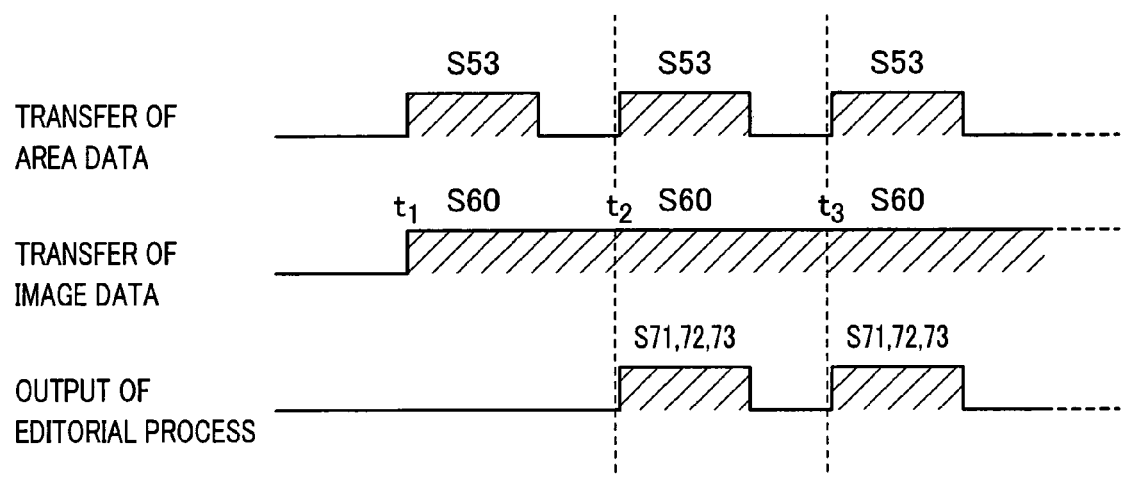
FIG. 18 is a timing chart showing a timing at which the transfer process of the area data is started, a timing at which the transfer process of the image data is started, and a timing at which the editorial process of the image data is started.

Note that, FIG. 14 is a flowchart showing an example of a process for generating the area data on the basis of the inputted image data and a process for storing the area data into the HDD 14. Further, FIG. 15 is a flowchart showing an example of a process for transferring the area data from the HDD 14 to the output image processing section 17. Further, FIG. 16 is a flowchart showing an example of a process for transferring the image data from the HDD 14 to the output image processing section 17. Further, FIG. 17 is a flowchart showing an example of a process in which the image processing device 2 edits an image of the image data on the basis of the area data. Further, FIG. 18 is a timing chart showing a timing at which the process for transferring the area data is started, a timing at which the process for transferring the image data is started, and a timing at which the process for editing the image data is started.

That is, when the input image receiving section 10 receives the image data from the image inputting device 1 as in the "process for storing the image data and the area data", the process branches into a storage process (SA) in which the image data is stored into the HDD 14 and a generation/storage process (SB) in which the area data is generated and stored, and these processes are simultaneously carried out.

Here, the storage process (SA) of the image data into the HDD 14 is carried out in the same manner as in the process illustrated in FIG. 11. While, the storage process (SB) of the area data into the HDD 14 is carried out as follows.

That is, when the input image receiving section 10 begins to receive the image data, the input image receiving section 10 transfers the received image data to the first compression transfer section 12 and sends the image data also to the area data generation section 11.

Then, the area data generation section 11 temporarily stores image data, corresponding to 8 lines, out of the received image data into the storage section 26 (S40). The area data generation section 11 carries out the image area separation process or the like with respect to the stored image data corresponding to 8 lines, and determines an attribute of the image data, and generates the area data on the basis of the determination (S41). Further, the area data generation section 11 sends the generated area data to the second compression transfer section 13.

Upon receiving the area data from the area data generation section 11, the second compression transfer section 13 compresses the area data and transfers the area data to the buffer 19 so as to temporarily stores the area data into the buffer 19 (S42). The process from the step S41 to the step S42 is repeated until the area data corresponding to the entire image data are generated (S43). In this way, when the area data corresponding to the entire image data are generated and the area data are stored in the buffer 19, the storage/reproduction control section 25 determines whether the image data transferred from the first compression transfer section 12 have been entirely stored in the HDD 14 or not (S44). That is, the storage/reproduction control section 25 determines whether the process for storing the image data into the HDD 14 has been finished or not. Note that, the determination in S44 is carried out until the image data are entirely stored into the HDD 14 ("NO" in S44).

In case where the process for storing the image data has been finished ("YES" in S44), the storage/reproduction control section 25 reads out the area data from the buffer 19, and stores the leading address of the area data into the HDD 14 (S45). Further, the storage/reproduction control section 25 stores the leading address of the area data stored in the HDD 14 into the storage section 26 (S46).

Note that, in the image processing device 20 according to the present embodiment, as in the image processing device of Embodiment 1, when the input image receiving section 10 receives the image data from the image inputting device 1, the image data is directly transferred by the first compression transfer section 12 to the HDD 14 as the RGB color system data. On this account, it is possible to quickly store the image data into the HDD 14.

Further, the image processing device 20 carries out only the image area separation process with respect to the inputted image data, so that it is possible to reduce time taken to store information (the image data and the area data) concerning the inputted image data into the HDD 14.

Further, the area data generation section 11 generates the area data on the basis of the image data corresponding to a single print document in Embodiment 2. Here, the area data is generated on the basis of the image data corresponding to a part of the print document, that is, the image data corresponding to 8 lines. On this account, merely the image data corresponding to 8 lines is stored into the storage section 26, so that it is possible to reduce the storage area of the storage section 26 used to generate the area data.

Further, in case of an arrangement in which the area data is generated on the basis of the image data corresponding to 8 lines, it is possible to start to generate the area data more quickly than the case where the area data is generated on the basis of the image data corresponding to a single print document.

Note that, an order in which the image data, the area data, the header information are stored in the HDD 14, a process for determining storage positions thereof or a similar process is the same as in Embodiment 2.

Further, in the image processing device 20 according to the present embodiment, the "process for reading out the image data and the area data" may be carried out as follows.

That is, when an instruction to start the printing process is given, the storage/reproduction control section 25 reads out the header information from the HDD 14 (S50). That is, the storage/reproduction control section 25 instructs the head of the HDD 14 to read out the header information from the disc of the HDD 14. In response to the instruction given from the storage/reproduction control section 25, the head reads out the header information from the disc and sends the header information to the storage/reproduction control section 25. On the basis of the header information having been read out, the storage/reproduction control section 25 instructs the head to read out the area data. Further, the storage/reproduction control section 25 temporarily stores the area data having been read out into the buffer 19 (S51).

Note that, the header information includes the leading address of the area data in the storage area of the HDD 14, and the area data are stored so that addresses are sequential in a physical storage area of the HDD 14. Thus, the storage/reproduction control section 25 easily causes the head to read out the area data merely by inputting the leading address into the head.

Upon temporarily storing the area data into the buffer 19, the storage/reproduction control section 25 instructs the second uncompression transfer section 16 to transfer the area data temporarily stored in the buffer 19 to the output image processing section 17 and instructs the first uncompression transfer section 15 to transfer the image data read out from the HDD 14 (start the step SC). Further, in response to the instruction given from the storage/reproduction control section 25, the first uncompression transfer section 15 gives an instruction to edit the image data on the basis of the transferred image data and the area data transferred by the second uncompression transfer section 16 in transferring the image data to the output image processing section 17 (start the step SD).

That is, the image processing device 2 transfers the area data and the image data, having been read out from the HDD 14, respectively via different paths (the second uncompression transfer section 16 and the first uncompression transfer section 15), to the output image processing section 17. Further, the output image processing section 17 carries out the editorial process with respect to the image data on the basis of the transferred area data before finishing the process for transferring the area data corresponding to the entire image data.

First, how the second uncompression transfer section 16 transfers the area data in the steps S53 to S55 of FIG. 5 is described as follows.

In response to the instruction given from the storage/reproduction control section 25, the second uncompression transfer section 16 reads out a part of the area data from the buffer 19 and compresses the area data having been read out so as to transfer the area data to the output image processing section 17 (S53). Specifically, the second uncompression transfer section 16 uncompresses the area data having been read out from the buffer 19 and sequentially transfers the uncompressed area data to the output image processing section 17. Note that, the second uncompression transfer section 16 count an amount of the transferred area data. When the amount of the transferred area data reaches a predetermined data amount (for example, a data amount corresponding to 8 lines of an image), the second uncompression transfer section 16 temporarily stops reading out the area data from the buffer 19.

Here, in order to synchronize with the process in which the first uncompression transfer section 15 transfers the image data, the storage/reproduction control section 25 does not carry out a process for transferring the area data corresponding to 8 lines of subsequent image data until transfer of the image data corresponding to 8 lines is finished (S54). Note that, the storage/reproduction control section 25 reads out the area data to the buffer 19 in synchronization with a process in which the first uncompression transfer section 15 transfers the image data as described later. That is, when a predetermined amount of the image data is transferred by the first uncompression transfer section 15 as described later, the storage/reproduction control section 25 gives an instruction to transfer a predetermined amount of subsequent image data to the first uncompression transfer section 15 and reads out a predetermined amount of the area data to the buffer 19.

Further, the process in the steps S53 to S54 is repeated ("NO" in S55) until transfer of the area data corresponding to the entire image data is finished. Further, when transfer of the area data corresponding to the entire image data is finished ("YES" in S55), transfer of the entire area data is finished.

Next, transfer of the image data is described as follows with reference to FIG. 16.

In response to the instruction given from the storage/reproduction control section 25, the first uncompression transfer section 15 reads out a part of the image data (image data corresponding to 8 lines of an image) from the HDD 14, and uncompresses the image data having been read out from the HDD 14 and transfers the image data to the output image processing section (S60). Specifically, the first uncompression transfer section 15 uncompresses the image data having been read out from the HDD 14, and sequentially transfers the uncompressed image data to the output image processing section 17.

Here, the first uncompression transfer section 15 counts an amount of transferred data. Further, when an amount of the image data transferred by the first uncompression transfer section 15 reaches a data amount corresponding to 8 lines of an image, the storage/reproduction control section 25 reads out image data corresponding to subsequent 8 lines of the image. Further, the storage/reproduction control section 25 instructs the first uncompression transfer section 15 to transfer the image data having been read out.

While, upon finishing transfer of the image data whose amount corresponds to 8 lines of an image, the first uncompression transfer section 15 instructs the output image processing section 17 to carry out the editorial process with respect to an image based on the image data and the area data having been transferred.

In this way, upon finishing transfer of the image data whose amount corresponds to 8 lines, the storage/reproduction control section 25 instructs the first uncompression transfer section 15 to transfer the image data corresponding to the data amount of 8 lines to the output image processing section 17.

Further, in response to the instruction given from the storage/reproduction control section 25, the first uncompression transfer section 15 repeats the process for transferring the image data whose amount correspond to 8 lines to the output image processing section 17 ("NO" in S62) until the process for transferring the image data is entirely finished. Further, when the transfer of the entire image data is finished, the process for transferring the image data is finished ("YES" in S62).

Next, how the output image processing section 17 carries out the editorial process on the basis of image data and area data of the image data is described as follows with reference to FIG. 17.

First, the output image processing section 17 is standby until the process for transferring the image data corresponding to 8 lines from the first uncompression transfer section 15 is finished. That is, the output image processing section 17 is standby until an instruction to carry out the editorial process of the image data is received from the first uncompression transfer section 15.

Note that, an amount of the image data corresponding to 8 lines of an image is larger than an amount of the area data corresponding to 8 lines of the image. On this account, it takes longer time to transfer the image data from the HDD 14 than the area data transferred via the buffer 19. Thus, at the instant of completion of the transfer in the step S60, the transfer of the area data in the step S53 has been necessarily completed.

Next, on the basis of the area data and the image data having been transferred, the output image processing section 17 carries out set-up of the editorial process of the image data corresponding to an attribute (S71). Further, the output image processing section 17 carries out the editorial process, having been set so as to correspond to the area data, with respect to the image data transferred from the first uncompression transfer section 15 (S72). Upon carrying out the editorial process of the image data, the output image processing section 17 sends YMCK color system image data or RGB color system image data, having been subjected to the editorial process, to the switching output section 18. While, the switching output section 18 selects an output destination of the edited image data and outputs the edited image data to the output destination (S73). Note that, as the output destination of the image data, the printing process device 3 or the PC etc. provided outside via a communication network is selected as described above.

Further, each edited image data corresponding to 8 lines of an image is outputted, and a process from steps S70 to S74 is repeated until the editorial process of the entire image data is finished (S74).

As described above, it is possible to operate the second uncompression transfer section 16 and the output image processing section 17 in synchronization with a timing at which transfer of the image data corresponding to 8 lines of an image from the first uncompression transfer section 15 is finished. On this account, in the image processing section 20, it is possible to reduce standby time in transferring the image data and the area data from the HDD 14 to the output image processing section 17 and it is possible to sequentially transfer the respective data. Thus, in the image processing device 20 according to the present embodiment, it is possible to improve efficiencies at which steps concerning the editorial process of the image data are carried out.

That is, as shown in FIG. 18, the image processing device 20 causes the first uncompression transfer section 15 to transfer the image data and causes the second uncompression transfer section 16 to transfer the area data in t1 in synchronization with each other. Further, the image processing device 20 causes the first uncompression transfer section 15 to transfer the image data, causes the second uncompression transfer section 16 to transfer the area data, and causes the output image processing section 17 to edit and output the image data in t2, t3, . . . in synchronization. In this way, as to the image edition process, the process for transferring the image data and the area data and the process for editing and outputting the image data can be simultaneously carried out, so that it is possible to raise the processing speed. Further, it is not necessary to provide a memory for storing the image data corresponding to a single document, and it is possible to quickly start the image processing without waiting for the image data corresponding to a single document to be entirely transferred.

Note that, the respective parts and the respective processing steps in the image processing device 2 of Embodiment 1 and the image processing device 20 of Embodiment 2 may be realized as follows: calculation means such as a CPU executes a program stored in storage means such as a ROM (Read Only Memory) or a RAM so as to control input means such as a key board, output means such as a display, or communication means such as an interface circuit. In this case, a computer having these means merely executes the program after reading out the program from a storage medium storing the program, so that it is possible to realizes the respective functions and the respective processing steps in the image processing devices 2 and 20 of the embodiments. Further, the program is stored in a removable storage medium, so that it is possible to realize the respective functions and the respective processing steps in an arbitrary computer.

As to the storage medium, a memory (not shown) for carrying out a process in a microcomputer, for example, a ROM may be used as a program medium. Further, the program medium may be arranged so that: a program reading device (not shown) is provided as an external storage device, and a storage medium is inserted into the program reading device, thereby reading the program.

Further, in any case, it is preferable that the stored program is accessed by a microprocessor and is executed. Further, it is preferable that: the program is read out, and the program having been read out is downloaded in a program storage area of the microcomputer, and the program is executed. Note that, a program for the downloading is stored in a main device in advance.

Further, the program medium is a storage medium which can be separated from the main device and holds the program in a fixed manner. Examples thereof include: tapes, such as magnetic tape and cassette tape; disks including magnetic discs, such as flexible disc and hard disc, and CD/MO/MD/DVD; cards, such as IC card (including memory cards); and semiconductor memories, such as mask ROMs, EPROMs (Erasable Programmable Read Only Memory), EEPROMs (Electrically Erasable Programmable Read Only Memory), and flash ROMs.

Further, it is preferable to use a storage medium which holds the program in a fluid manner so that the program is downloaded from a communication network such as the Internet as long as the system can be connected to the communication network.

Further, in case of downloading the program from the communication network in this manner, it is preferable that a downloading program is stored in the main device in advance or the downloading program is installed from another storage medium.

Further, the image processing device 20 is arranged so that the data information 27 is stored in the storage section 26, but the image processing device 20 may be arranged so that the storage section 26 is not provided and the data information 27 is stored in a predetermined area in the storage area of the HDD 14.

Figure 9:
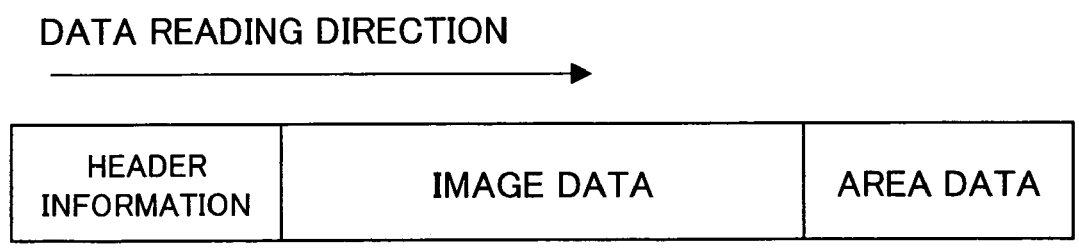
FIG. 9 is a diagram showing, as another embodiment of the present invention, a relation between (i) storage positions of image data, area data, and header information stored in a storage region of an HDD and (ii) a reading direction of a head.

Further, in the image processing device 20, the image data, the area data, and the header information are stored in the HDD 14 in an order of the header information, the area data, and the image data sequentially disposed with respect to a direction in which the head of the HDD 14 reads the information. Storage positions of the information are not limited to them. For example, as shown in FIG. 9, it may be so arranged that the header information, the image data, and the area data are stored in this order with respect to the direction in which the head of the HDD 14 reads the information.

In case of storing the information into a vacant area of the storage area of the HDD 14 in this order, a position from which writing of each information is started (leading address) is determined as follows.

That is, the image data transferred by the first compression transfer section 12 is stored in a vacant area in the storage area of the HDD 14. Note that, a position from which writing of the image data is started is set so as to satisfy the following condition.

That is, in the storage area of the HDD 14, the image data is stored in an area positioned before a point from which writing of the stored image data is started so that a vacant area for storing at least the header information is secured.

When the image data is stored, the area data corresponding to an address subsequent to the last address of the stored image data is stored in response to the instruction given from the storage/reproduction control section 25. In this way, when the image data and the area data are sequentially stored into a vacant area in the storage area of the HDD 14 in this order with respect to a reading direction of the head, the header information is stored into a vacant area positioned before the image data. The leading address from which writing of the header information is started is calculated so as to be a previous address positioned before the leasing address of the image data stored in the HDD so that a distance between both the addresses corresponds to a data size of the header information.

Further, when the leading address for writing the header information is calculated, the storage/reproduction control section 25 controls the head so as to sequentially store the header information from the calculated address. In this way, in the image processing device 20 according to the present embodiment, it is possible to sequentially store the header information, the image data, and the area data into the storage area of the HDD 14 in this order.

In case where the information are stored into the storage area of the HDD 14, only the calculation of the writing starting position of the header information on the basis of the leading address of the stored image data is carried out. Thus, in case where the information are stored into the storage area of the HDD 14 in the order shown in FIG. 9, it is possible to store the information more quickly than in case where the information are stored in the order shown in FIG. 8, since less calculation for determining the writing starting positions of the information is required.

Note that, in the present invention, it is also possible to use a storage device (data storage section) other than the disc type storage device as a storage device for storing the image data and the area data. Examples of the data storage section serving as the foregoing storage device include a semiconductor storage device such as a flash memory, DDR-DRAM, etc., and an external storage device whose connection is allowed by a SAN (Storage Area Network).

In case of using the data storage section, the HDD 14 of the foregoing embodiments is replaced by the data storage section. That is, a function implemented by the HDD 14 in the foregoing embodiments is implemented by the semiconductor storage device or the external storage device whose capacity is sufficient to store inputted data, thereby realizing the present invention.

As described above, the image processing device according to the present invention is arranged so as to include: a receiving section for receiving image data having been inputted; a first transfer section for transferring the image data received by the receiving section directly to the disc type storage device; an attribute information generation section for generating attribute information of the image data on the basis of the image data received by the receiving section; a second transfer section for transferring the attribute information to the disc type storage device; and an edition section for editing the image data, stored in the disc type storage device, on the basis of the attribute information stored in the disc type storage device, wherein the attribute information generation section generates the attribute information and the second transfer section transfers the attribute information while the first transfer section is transferring the image data.

Further, as described above, the method according to the present invention for controlling transfer carried out by the image processing device includes the steps of: (i) receiving the image data having been inputted; (ii) transferring the image data, having been received in the step (i), directly to the disc type storage device; (iii) generating attribute information of the image data on the basis of the image data having been received in the step (i); and (iv) transferring the attribute information to the disc type storage device; and (v) editing the image data on the basis of the attribute information stored in the disc type storage device, wherein the attribute information generation section generates the attribute information and the second transfer section transfers the attribute information while transferring the image data in the step (ii).

Thus, in the image processing device according to the present invention and the method according to the present invention for controlling transfer carried out by the image processing device, it is possible to simultaneously carry out the process for transferring the image data to the disc type storage device and the process for generating the attribute information on the basis of the image data so as to transfer the attribute information to the disc type storage device, so that it is possible to efficiently store the image data and the attribute information into the disc type storage device.

Further, the image data and the attribute information are stored into the disc type storage device as information used to carry out the editorial process with respect to an image, so that the image processing device enables the edition section to carry out an appropriate editorial process with respect to the image data so as to correspond to each attribute.

Thus, in the image processing device according to the present invention and the method according to the present invention for controlling transfer carried out by the image processing device, it is possible to quickly transfer and store information required in the editorial process of the image data into the disc type storage device, thereby carrying out the editorial process more efficiently.

Further, as described above, the image processing device according to the present invention has: a disc type storage device for storing image data and attribute information indicative of an attribute of the image data; and an edition section for editing the image data, stored in the disc type storage device, on the basis of the attribute information stored in the disc type storage device, and the image processing device includes: a storage device for temporarily storing the attribute information stored in the disc type storage device; a first output section for outputting the attribute information, stored in the storage device, to the edition section; and a second output section for outputting the image data, stored in the disc type storage device, to the edition section.

Further, as described above, the method according to the present invention is a method for controlling output carried out by an image processing device including: a disc type storage device for storing image data and attribute information indicative of an attribute of the image data; and an edition section for editing the image data, stored in the disc type storage device, on the basis of the attribute information stored in the disc type storage device, and the method includes the steps of: (i) temporarily storing the attribute information having been stored in the disc type storage device; (ii) outputting the attribute information, having been stored in the step (i), to the edition section; and (iii) outputting the image data, having been stored in the disc type storage device, to the edition section.

Thus, in the image processing device according to the present invention and the method according to the present invention for controlling output carried out by the image processing device, it is possible to quickly and efficiently read out the image data and the attribute information stored in the disc type storage device.

Further, the image processing device according to the present invention may be arranged so as to further include a storage device for temporarily storing the attribute information, wherein the second transfer section temporarily stores the attribute information into the storage device and transfers the attribute information to the disc type storage device.

The image processing device according to the present invention includes the storage device, so that it is possible to store the attribute information into the disc type storage device after temporarily storing the attribute information into the storage device. Thus, the image processing device can respectively store the image data and the attribute information into the disc type storage device at timings different from each other.

Thus, a series of the image data and the attribute information can be collectively stored into a disc of the disc type storage device. As a result, the image data and the attribute information are not separately stored in the disc, so that it is possible to reduce a distance at which a head of the disc type storage device moves.

In this way, in the image processing device according to the present invention, it is possible to reduce the distance at which the head moves, thereby reducing loss caused by movement of the head. Thus, the image processing device can quickly store the image data and the attribute information into the disc type storage device respectively.

Further, the image processing device according to the present invention is arranged so that: the first transfer section informs the second transfer section that transfer of the image data is finished upon finishing the transfer, and the second transfer section transfers the attribute information, stored in the storage device, to the disc type storage device upon being informed by the first transfer section that the transfer of the image data is finished.

In this way, the image processing device can store the attribute information after storing the image data into the disc type storage device, so that it is possible to store the attribute information right after the image data in sequence.

It is possible to sequentially store the image data and the attribute information into the disc type storage device. As a result, it is possible to reduce the distance at which the head moves in reading out the attribute information and the image data, so that the head can quickly read out the information.

Thus, the image processing device can quickly read out the image data and the attribute information.

Further, the image processing device according to the present invention may be arranged so as to further include a storage control section for controlling a storage process carried out in the disc type storage device, wherein the storage control section causes the disc type storage device to store, in a predetermined order, addresses indicative of areas in which the image data and the attribute information respectively stored.

That is, in case where an order of the addresses indicative of the areas respectively storing the image data and the attribute information is an order in which the image data and the attribute information are stored, a moving direction of the head of the disc type storage device at the time of storage corresponds to the order in which the information are stored, so that the respective information are smoothly stored into the disc type storage device.

While, in case where an order of the addresses indicative of the areas respectively storing the image data and the attribute information is an order in which the image data and the attribute information are respectively read out, a moving direction of the head of the disc type storage device at the time of reading corresponds to the order in which the information are stored, so that the respective information are smoothly read out from the disc type storage device.

Thus, the image processing device causes the head to less move in storing or reading out the image data and the attribute information, so that it is possible to quickly store the image data and the attribute information into the disc type storage device or it is possible to quickly output the image data and the attribute information from the disc type storage device.

Further, it is preferable to arrange the image processing device according to the present invention so that the storage control section causes the disc type storage device to store the image data and the attribute information so that an address indicative of an area storing the attribute information is positioned before an address indicative of an area storing the image data.

That is, the storage control section stores the image data and the attribute information into the disc type storage device in an order in which the respective information are stored, so that the respective information are stored so as to correspond to a moving direction of the head of the disc type storage device.

Thus, the image processing device causes the head to less move in storing the image data and the attribute information, so that it is possible to quickly store the image data and the attribute information.

Further, the image processing device according to the present invention may be arranged so that the image data and the attribute information are stored in the disc type storage device as a single file.

That is, in the image processing device, the image data and the attribute information are stored in the disc type storage device as a single file, so that it is possible to less frequently open and close the file than a case where files of respective image data corresponding to attributes of the attribute information.

Thus, the image processing device can quickly store and read out the image data and the attribute information into and from the disc type storage device.

Further, the image processing device according to the present invention includes a management information generation section for generating management information indicative of positions of the image data and the attribute information that have been stored in the disc type storage device, wherein the management information generated by the management information generation section is stored in the disc type storage device together with the image data and the attribute information.

Thus, the image processing device can generate the management information, so that it is possible to quickly find storage positions of the image data and the attribute information with reference to the management information.

Thus, the image processing device can efficiently read out the image data and the attribute information.

Further, the image processing device according to the present invention is arranged so that the storage control section causes the disc type storage device to store an address indicative of an area storing the management information in such an order that the address indicative of the area storing the management information is positioned before the addresses indicative of the areas respectively storing the image data and the attribute information.

That is, the address indicative of the area storing the management information is positioned before the addresses indicative of the areas respectively storing the image data and the attribute information, so that the address indicative of the area storing the management information is positioned so that the head least moves in reading out the information.

Incidentally, in case where the image processing device is arranged so that storage positions of the image data and the attribute information are confirmed on the basis of the management information, the management information is read out prior to reading of the image data and the attribute information in reading out the respective information.

Thus, in case of reading out the image data and the attribute information on the basis of the management information, the image processing device enables the head to less moves since the management information is stored in the address read out prior to reading of the image data and the attribute information.

Thus, the image processing device can quickly read out the image data and the attribute information from the disc type storage device.

Note that, the foregoing respective sections of the image processing device may be realized by a computer. In this case, the present invention also includes a computer-readable storage medium storing a control program of a printing device realized by a computer caused to function as the foregoing respective sections.

The present invention is not limited to the description of the embodiments above, but may be altered by a skilled person within the scope of the claims. An embodiment based on a proper combination of technical means disclosed in different embodiments is encompassed in the technical scope of the present invention.

The image processing device according to the present invention can transfer inputted image data to the disc type storage device and transfer attribute information of the image data to the disc type storage device in parallel, and can quickly store the image data and the attribute information into the disc type storage device. On this account, the image processing device is applicable to such purpose that: inputted data and information based on the data are stored into a disc type storage device, and the data and the information are outputted as required.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing device which transfers image data, having been inputted, to a disc type storage device, said image processing device comprising:

a receiving section for receiving the image data having been inputted;

a first transfer section for transferring the image data received by the receiving section directly to the disc type storage device;

an attribute information generation section for generating attribute information of the image data on the basis of the image data received by the receiving section; and a second transfer section for transferring the attribute information to the disc type storage device, wherein the receiving section sends the image data, having been inputted, to the first transfer section and the attribute information generation section in parallel.

2. The image processing device in claim 1, further comprising a storage device for temporarily storing the attribute information, wherein the second transfer section temporarily stores the attribute information into the storage device and transfers the attribute information to the disc type storage device.

3. The image processing device in claim 2, wherein:

the first transfer section informs the second transfer section that transfer of the image data is finished upon finishing the transfer, and the second transfer section transfers the attribute information, stored in the storage device, to the disc type storage device upon being informed by the first transfer section that the transfer of the image data is finished.

4. The image processing device in claim 3, further comprising a storage control section for controlling a storage process carried out in the disc type storage device, wherein the storage control section causes the disc type storage device to store, in a predetermined order, addresses indicative of areas in which the image data and the attribute information respectively stored.

5. The image processing device in claim 4, wherein the storage control section causes the disc type storage device to store the image data and the attribute information so that an address indicative of an area storing the attribute information is positioned before an address indicative of an area storing the image data.

6. The image processing device in claim 4, comprising a management information generation section for generating management information indicative of positions of the image data and the attribute information that have been stored in the disc type storage device, wherein the management information generated by the management information generation section is stored in the disc type storage device together with the image data and the attribute information.

7. The image processing device in claim 6, wherein the storage control section causes the disc type storage device to store an address indicative of an area storing the management information in such an order that the address indicative of the area storing the management information is positioned before the addresses indicative of the areas respectively storing the image data and the attribute information.

8. The image processing device in claim 2, wherein the image data and the attribute information are stored in the disc type storage device as a single file.

9. An image processing device, including:

a disc type storage device for storing image data and attribute information indicative of an attribute of the image data; and an edition section for editing the image data, stored in the disc type storage device, on the basis of the attribute information stored in the disc type storage device, said image processing device comprising:

a storage device for temporarily storing the attribute information stored in the disc type storage device;

a first output section for outputting the attribute information, stored in the storage device, to the edition section; and a second output section for outputting the image data, stored in the disc type storage device, to the edition section.

10. A method for controlling transfer carried out by an image processing device which transfers image data, having been inputted, to a disc type storage device, said method comprising the steps of:

(i) receiving the image data having been inputted;

(ii) transferring the image data, having been received in the step (i), directly to the disc type storage device;

(iii) generating attribute information of the image data on the basis of the image data having been received in the step (i); and (iv) transferring the attribute information to the disc type storage device, wherein the image data having been inputted in the step (i) is provided as image data used in the steps (ii) and (iii) in parallel with the steps.

11. A method for controlling output carried out by an image processing device including: a disc type storage device for storing image data and attribute information indicative of an attribute of the image data; and an edition section for editing the image data, stored in the disc type storage device, on the basis of the attribute information stored in the disc type storage device, said method comprising the steps of:

(i) temporarily storing the attribute information having been stored in the disc type storage device;

(ii) outputting the attribute information, having been stored in the step (i), to the edition section; and (iii) outputting the image data, having been stored in the disc type storage device, to the edition section.

12. A method for controlling output carried out by an image processing device including: a data storage section for storing image data and attribute information indicative of an attribute of the image data; and an edition section for editing the image data, stored in the data storage section, on the basis of the attribute information stored in the data storage section, said method comprising the steps of:

(i) temporarily storing the attribute information having been stored in the data storage section;

(ii) outputting the attribute information, having been stored in the step (i), to the edition section; and (iii) outputting the image data, having been stored in the data storage section, to the edition section.

13. A computer-readable storage medium, storing a set of instructions, executed by a processor, to perform a method comprising:

receiving the image data having been inputted;

transferring the received image data directly to the disc type storage device;

generating attribute information of the image data on the basis of the received image data; and transferring the attribute information to the disc type storage device, wherein the image data, having been inputted, is sent to the disc type storage device simultaneously as the attribute information is generated.

14. An image processing device which transfers image data, having been inputted, to a data storage section, said image processing device comprising:

a receiving section for receiving the image data having been inputted;

a first transfer section for transferring the image data received by the receiving section directly to the data storage section;

an attribute information generation section for generating attribute information of the image data on the basis of the image data received by the receiving section; and a second transfer section for transferring the attribute information to the data storage section, wherein the receiving section sends the image data, having been inputted, to the first transfer section and the attribute information generation section in parallel.

15. An image processing device, including:

a data storage section for storing image data and attribute information indicative of an attribute of the image data; and an edition section for editing the image data, stored in the data storage section, on the basis of the attribute information stored in the data storage section, said image processing device comprising:

a storage device for temporarily storing the attribute information stored in the data storage section;

a first output section for outputting the attribute information, stored in the storage device, to the edition section; and a second output section for outputting the image data, stored in the data storage section, to the edition section.

16. A method for controlling transfer carried out by an image processing device which transfers image data, having been inputted, to a data storage section, said method comprising the steps of (i) receiving the image data having been inputted;

(ii) transferring the image data, having been received in the step (i), directly to the data storage section;

(iii) generating attribute information of the image data on the basis of the image data having been received in the step (i); and (iv) transferring the attribute information to the data storage section, wherein the image data having been inputted in the step (i) is provided as image data used in the steps (ii) and (iii) in parallel with the steps.

* * * * *